United States Patent
Kannon et al.

[11] Patent Number: 6,081,627
[45] Date of Patent: Jun. 27, 2000

[54] TWO-DIMENSIONAL CODE READER

[75] Inventors: Tetsuya Kannon; Yoshihiro Kojima, both of Osaka; Katsushi Inoue, Kyoto; Keiichi Kobayashi, Osaka, all of Japan

[73] Assignee: Matsushita Electric Industrial Co., Ltd., Osaka, Japan

[21] Appl. No.: 08/917,051

[22] Filed: Aug. 22, 1997

[30] Foreign Application Priority Data

Aug. 23, 1996 [JP] Japan ................................. 8-222111

[51] Int. Cl.[7] .................................................. G06K 7/00
[52] U.S. Cl. ........................ 382/312; 382/313; 382/318; 235/494
[58] Field of Search ................................ 382/312, 313, 382/318, 321; 235/494, 455

[56] References Cited

U.S. PATENT DOCUMENTS 5,726,435   3/1998   Hara et al. .............................. 235/494

FOREIGN PATENT DOCUMENTS 1-35385   7/1989   Japan ................................. G06K 9/46
7-234915  9/1995   Japan ................................. G06K 7/10

*Primary Examiner*—Jose L. Couso
*Assistant Examiner*—Anh Hong Do
*Attorney, Agent, or Firm*—Pearne, Gordon, McCoy & Granger LLP

[57] ABSTRACT

A two-dimensional code reader for precisely and fast reading a two-dimensional code image containing luminance unevenness caused by variations in illumination, etc. To binarize cells, first the gray levels of the pixels at the center points of the cells are extracted, a local threshold value is found only from the extracted gray levels, and the gray levels are compared with the local threshold value, thereby binarizing the cells.

2 Claims, 18 Drawing Sheets

TWO-DIMENSIONAL CODE READER

BACKGROUND OF THE INVENTION

This invention relates to a two-dimensional code reader for reading two-dimensional code.

Conventional two-dimensional code read means uses a CCD area sensor as a sensor and performs processing in the order of (1) binarizing analog image information output from the CCD area sensor, (2) detecting two-dimensional code from binarized image data, and (3) extracting cell data of the detected two-dimensional code, as shown in Japanese Patent Laid-Open No. Hei 7-234915.

The following three methods are executed as the step in (1):

The first binarization method is to compare an image signal sent from the CCD area sensor with a given threshold value for binarization. FIG. 26(b) shows an example of a binarization circuit with a fixed threshold value. Analog signal voltage output from the CCD area sensor enters input Vin and is compared with voltage Eo. If the analog signal voltage is higher than the voltage Eo, a signal of 1 is output; if the analog signal voltage is lower than the voltage Eo, a signal of 0 is output. In FIG. 26(a), the portion of waveform Vin higher than the value of the voltage Eo becomes 0 (white) and the portion of waveform Vin lower than the value of the voltage Eo becomes 1 (black).

The second binarization method is to compare an image signal with a floating threshold value found from a slightly preceding image signal for binarization. FIG. 26(c) shows an example of a binarization-circuit with a floating threshold value. The binarization circuit uses Ev provided by low-frequency filtering (integrating) input signal Vin as a threshold value. The threshold value Ev becomes Ev in FIG. 26(a). If Vin is higher than Ev, 0 (white) is output; if Vin is lower than Ev, 1 (black) is output.

The third binarization method is a method of converting an analog image signal output from the CCD area sensor into digital form, storing a 1-screen image signal in an image memory, and using information of a gray level distribution of the image for binarization. FIG. 23 is an example of the binarization method. First, a shading (luminance unevenness) correction for removing the effect of luminance unevenness, etc., is made on the whole screen for the image stored in the image memory at step 51. For the shading correction, a method of removing a low-frequency component from the image through a homomorphic filter is available, for example. Next, a gray level distribution histogram of the image is prepared and a threshold value is found by a 2-mode method at step 52.

As the step in (2) after the binarization is executed, two-dimensional code is detected. To detect two-dimensional code is to detect the position of the two-dimensional code. A method using chain coding, for example, as disclosed in Japanese Patent Publication No. Hei 1-35385 is often used for detecting the two-dimensional code position.

The chain coding, which is a method of finding the outline of a figure, traces the boundary between black pixels 241 and white pixels 242 (243), finds the outline of the figure, and detects the two-dimensional code.

Particularly, a method using Hough transformation is proposed as in Japanese Patent Laid-Open No. Hei 7-234915 as a detection method of two-dimensional code having at least two outer sides as straight lines like two-dimensional code 20.

The Hough transformation is a method of globally extracting points arranged on a line in an image and is known as effective line detection means. In Japanese Patent Laid-Open No. Hei 7-234915, the Hough transformation is used to detect two sets of lines and two-dimensional code is detected.

Line detection using the Hough transformation will be discussed with reference to FIGS. 25(a) and (b). The image memory is scanned with a given spacing in a longitudinal direction to find an edge point. A sine curve corresponding to the coordinates of the found edge point is drawn on θ (angle)-ρ (distance) plane. For example, edge points 251, 252, 253, and 254 are converted into curves 256, 257, 258, and 259 on the θ-ρ plane. If the edge points are arranged in a line like the edge points 251, 252, and 253, three sine curves cross as at point 260 in FIG. 25(b). In fact, quantization is executed on the θ-ρ plane and votes are given to the point (θ,ρ) one by one correspondingly to the sine curves passing through that point. Thus, three votes are given to the point 260. Points to which a large number of votes are given like the point 260 are found, whereby line 255 can be detected.

After the two-dimensional code is detected, in the step in (3), the position of the center point of each cell of the two-dimensional code is found and binary data of the center point of the each cell is extracted. At this time, since binarization is already executed in the step in (1), the gray level of the pixel at the center point of each cell is simply read, whereby binary data of the cell can be extracted.

The binarization methods in the conventional examples involve the following problems:

In the first binarization method using a fixed threshold value, precise binarization can be executed if image contrast is good and luminance unevenness, etc., does not exist; if contrast is poor or if luminance unevenness is caused by affection of applied illumination light, correct binarization cannot be executed. If fine lines or small points extend across the light receiving elements of the sensor, they are often ignored because no sufficient output may be provided like 221 in FIG. 26(a).

The second binarization method, which binarizes using a floating threshold value, solves the problems of the first binarization method, such as luminance unevenness and loss of fine lines, etc. However, even in the second binarization method, normal binarization cannot be executed for a waveform in which black signal less than Eo continuously elongates due to luminance unevenness. This means that an area where black continues in the direction along the image signal and luminance unevenness exists cannot correctly be binarized.

The third binarization method solves the problems of the first and second binarization methods. However, all image information is once stored in the image memory and shading correction and binarization processing are executed for all image information, thus it takes very long processing time.

The conventional two-dimensional code detection involves the following problems:

In the detection processing using the chain coding described above, if a figure with a flaw 244 as in FIG. 24(b) is read, the flaw part is recognized as a contour as indicated by an arrow 245 in FIG. 24, namely, a contour different from the original contour is recognized and two-dimensional code cannot correctly be detected.

In the detection using the Hough transformation as described above, unlike the detection processing using the chain coding, global line detection is executed as described above, so that line detection can be executed without receiving the effect of a flaw, etc. However, since a large number of edge points are converted into sine curves to execute line detection using the Hough transformation, the computation amount increases and it takes processing time.

SUMMARY OF THE INVENTION

It is therefore an object of the invention to provide a two-dimensional code reader that can fast and precisely detect two-dimensional code having a feature pattern made up of straight line segments for detection, and binarize cells at high speed and precisely.

The present invention provides a first two-dimensional code reader comprising:

conversion means for receiving light reflected from two-dimensional code and converting the light into an image signal;

storage means for storing the image signal as an image memory;

code detection means for providing from the image memory a detected two-dimensional code; and cell binarization means for binarizing values of predetermined pixels for respective cells on the detected two-dimensional code.

In a second two-dimensional code reader, said cell binarization means comprises:

cell gray level extraction means for finding respective gray levels of the predetermined pixels based on image signals obtained from the predetermined pixels of the cells on the detected two-dimensional code;

local threshold value determination means for finding a local threshold value from the gray levels determined by said cell gray level extraction means; and cell binary determination means for comparing each of the gray levels found by said cell gray level extraction means with the threshold value found by said local threshold value determination means to find binary data for a corresponding cell.

In a third two-dimensional code reader, said local threshold value determination means defines a plurality of small areas, finds an average value and amplitude of maximum and minimum values of the gray levels of the predetermined pixels of the cells located in each of the small areas, compares adjacent small areas in terms of amplitude, and if one of the small areas has an amplitude of a predetermined value or less as compared with the other, determines a threshold value of the former small area based on the latter small area.

In a fourth two-dimensional code reader, said local threshold value determination means compares the adjacent small areas in terms of amplitude, and unless one of the small areas has the amplitude of the predetermined value or less as compared with the other, adopts an average value of the average values found in the small areas as a threshold value of the former small area.

In a fifth two-dimensional code reader, said cell binarization means comprises:

cell gray level extraction means for finding respective gray levels of the pixels based on image signals obtained from the predetermined pixels of the cells on the detected two-dimensional code;

gray level distribution preparation means for preparing a gray level histogram from the gray levels determined by the cell gray level extraction means;

luminance unevenness determination means for determining whether or not luminance unevenness exists from the histogram prepared by the gray level distribution preparation means;

threshold value determination means for finding threshold values from the histogram if it is determined by said luminance unevenness determination means that luminance unevenness exists; and cell binary determination means for comparing the gray level found by said cell gray level extraction means with corresponding one of the threshold values found by said threshold value determination means to find binary data of a respective cell.

In a sixth two-dimensional code reader, said predetermined pixel is a pixel located at a substantial center of each cell.

In a seventh two-dimensional code reader, said code detection means comprises:

edge detection means for scanning the image memory in longitudinal and lateral directions to detect edges of the detected two-dimensional code on the scanning lines;

edge gradient detection means for finding gradients of the edges found by said edge detection means; and linear line detection means for tracing the edges and finding lines based on the gradients found by said edge gradient detection means.

In an eighth two-dimensional code reader, said edge gradient detection means comprises:

means for scanning the proximity of a first edge detected on a first scanning line by two, second and third, scanning lines parallel with the first scanning line; and comparison means for detecting second and third edges of the detected two-dimensional code respectively on the second and third scanning lines scanned by said edge detection means and comparing a gradient of a line connecting the first and second edges with a gradient of a line connecting the first and third edges, and wherein if said comparison means determines that both gradients are substantially the same, said edge gradient determination means detects the edge gradient.

In a ninth two-dimensional code reader, said edge gradient detection means comprises:

means for scanning the proximity of a first edge detected on a first scanning line by three or more scanning lines parallel with the first scanning line; and comparison means for detecting a plurality of edges of the detected two-dimensional code on the three or more scanning lines scanned by said edge detection means and comparing gradients of lines connecting the first edge and the plurality of edges mutually with each other, and wherein if said comparison means determines that variations in the gradients of the lines are a given value or less, said edge gradient determination means detects the edge gradient.

In a tenth two-dimensional code reader, said means for scanning the proximity of the first edge scans both sides of the image memory with respect to the first edge.

In an eleventh two-dimensional code reader, said linear line detection means traces an edge every predetermined interval, and if the edge cannot be detected once, continues to trace an edge a predetermined number of times every predetermined interval, and if the edge cannot be detected even after the tracing is continued to be executed the predetermined number of times, stops the detection operation.

In a twelfth two-dimensional code reader, said code detection means comprises:

edge detection means for scanning the image memory in longitudinal and lateral directions and detecting a plurality of edges of the detected two-dimensional code on scanning lines;

means for detecting a first edge point row arranged with a specific positional relationship on a first one of the scanning line from the plurality of edges detected by said edge detection means; and gradient detection means for detecting edges on another second scanning line, which respectively correspond in type to and are located nearest to the edges of the first edge point row and detecting a gradient of line connecting the corresponding edges between the first and second scanning lines.

In a thirteenth two-dimensional code reader, if variations in the gradients of the lines are a given value or more, detection is again executed.

In a fourteenth two-dimensional code reader, a scanning line interval between the first and second scanning line when edges are traced is less than a value obtained by adding width of a bar and width of a space together and dividing the result by two.

In a fifteenth two-dimensional code reader, tracing is continued if a predetermined number of edges making up an edge point row are detected on a single scanning line.

In a sixteenth two-dimensional code reader, said code detection means comprises:

edge detection means for scanning the image memory in longitudinal and lateral directions and detecting a plurality of edges of the detected two-dimensional code on scanning lines;

means for detecting a first edge point row arranged with a specific positional relationship on a single scanning line from the plurality of edges detected by said edge detection means; and gradient detection means for detecting a second edge point row almost matching the first edge point row detected by said edge point row detection means in the proximity of the first edge point row and detecting a gradient formed by both the edge point rows.

In a seventeenth two-dimensional code reader, edge point rows almost matching the first edge point row are repeatedly detected based on the first edge point row detected by said edge point row detection means in a direction defined by the gradient detected by said gradient detection means, to thereby provide the detected two-dimensional code.

In an eighteenth two-dimensional code reader, said code detection means moves a scanning line position each time a new image is read.

The first two-dimensional code reader of the invention detects two-dimensional code, then binarizes the values of the predetermined pixels of the cells of the two-dimensional code detected by the code detection means, thus the number of pixels binarized can be drastically reduced, so that the time taken for the binarization processing can be extremely shortened.

The second two-dimensional code reader of the invention comprises the cell binary determination means for comparing the gray level found by the cell gray level extraction means with the threshold value found by the local threshold value determination means and finding binary data of the cell, whereby the cells can be binarized without receiving the effect of luminance unevenness. Since only the predetermined pixels of the cells are accessed, the time taken for the binarization processing can be shortened.

In the third two-dimensional code reader of the invention, the local threshold value determination means determines a plurality of small areas, finds an average value and amplitude of maximum and minimum values of the gray levels of the predetermined pixels of the cells in each small area, compares the adjacent small areas in amplitude, and if one of the small areas has an amplitude of a predetermined value or less as compared with the other, determines a threshold value of the former small area based on the latter small area, whereby the cells can be binarized in a short processing time without receiving the effect of luminance unevenness.

In the fourth two-dimensional code reader of the invention, the local threshold value determination means compares the adjacent small areas in amplitude and unless one of the small areas has an amplitude of a predetermined value or less as compared with the other, adopts an average value of the average values found in the small areas as a threshold value of the former small area, so that the binarization processing can be furthermore speeded up.

The fifth two-dimensional code reader of the invention comprises the threshold value determination means for finding a threshold value from the histogram if it is determined by the inconsistencies-in-brightness determination means that luminance unevenness exists and the cell binary determination means for comparing the gray level found by the cell gray level extraction means with the threshold value found by the threshold value determination means and finding binary data of the cell, whereby binarization can be executed at high speed independently of luminance unevenness and when luminance unevenness does not exist, the processing method can be changed for selecting a faster processing method.

In the sixth two-dimensional code reader of the invention, a pixel at a substantial center of each cell is the predetermined pixel, thus the gray level of each cell can be detected most reliably.

In the seventh two-dimensional code reader of the invention, the code detection means comprises the edge detection means for scanning the image memory in longitudinal and lateral directions and detecting edges of two-dimensional code on the scanning line, the edge gradient detection means for finding gradients of the edges found by the edge detection means, and the line detection means being responsive to the gradients found by the edge gradient detection means for tracing the edges and finding lines, whereby the number of scanning lines can be lessened, namely, accessing the image memory can be lessened, so that two-dimensional code can be detected at high speed.

In the eighth two-dimensional code reader of the invention, the edge gradient detection means comprises the scanning means for scanning the proximity of a first edge detected on the scanning line on two lines parallel with the scanning line and the comparison means for detecting second and third edges of two-dimensional code on the two lines scanned by the edge detection means and comparing a gradient of a line connecting the first and second edges with a gradient of a line connecting the first and third edges, if the comparison means determines that both gradients are substantially the same, the edge gradient determination means for detecting the edge gradient, whereby the line gradient is found and line detection is enabled based on the gradient. Thus, if a part of the line is dirty, the line can be extracted correctly.

In the ninth two-dimensional code reader of the invention, the edge gradient detection means comprises means for scanning the proximity of a first edge detected on the scanning line on three or more lines parallel with the scanning line and the comparison means for detecting a plurality of edges of two-dimensional code on the three or more lines scanned by the edge detection means and comparing gradients of lines connecting the first edge and the edges with each other, if the comparison means determines that variations in the gradients of the lines are a given value or less, the edge gradient determination means for detecting the edge gradient, whereby the line gradient is found and line detection is enabled based on the gradient. Thus, if a part of the line is dirty, the line can be extracted correctly.

In the tenth two-dimensional code reader of the invention, the scanning means scans so that the lines face each other with the first edge between, thus the gradients on both sides of the first edge can be checked.

In the eleventh two-dimensional code reader of the invention, the line detection means traces an edge every predetermined spacing and if the edge cannot be detected, traces an edge every predetermined spacing a predetermined number of times and if the edge cannot be detected, stops the detection operation. Thus, if dirt, etc., exists, the detection operation is not stopped by mistake.

The twelfth two-dimensional code reader of the invention comprises the gradient detection means for detecting separately detected edges of the same type as and nearest to the edges of the edge point row and detecting gradients of lines connecting the edges of the same type, thereby finding the gradients of bars arranged in parallel and executing line detection based on the gradients. Thus, if a part of the bars is dirty, the line can be extracted correctly.

In the thirteenth two-dimensional code reader of the invention, if variations in the gradients of the lines are a given value or more, detection is again executed, so that gradients can be detected reliably.

In the fourteenth two-dimensional code reader of the invention, a scanning line spacing when edges are traced is less than a value resulting from adding width of a bar and width of a space together and dividing the result by two, thus an erroneous part is not recognized as an edge.

In the fifteenth two-dimensional code reader of the invention, tracing is continued if a predetermined number of edges making up an edge point row are detected on a single scanning line. Thus, the detection operation is not stopped by mistake because of the effect of dirt, etc.

In the sixteenth two-dimensional code reader of the invention, the code detection means comprises the edge detection means for scanning the image memory in the longitudinal and lateral directions and detecting the edges of two-dimensional code on the scanning line, the edge point row detection means for detecting an edge point row arranged with a specific positional relationship on a single scanning line from a plurality of edges detected by the edge detection means, and the gradient detection means for detecting an edge point row greatly matching the edge point row detected by the edge point row detection means in the proximity of the edge point row and detecting a gradient formed by both the edge point rows, thereby finding the gradients of bars arranged in parallel and executing line detection based on the gradients. Thus, if a part of the bars is dirty, the line can be extracted correctly.

In the seventeenth two-dimensional code reader of the invention, edge point rows greatly matching the edge point row are repeatedly detected from the edge point rows detected by the edge point row detection means in a direction of the gradient detected by the gradient detection means, thereby detecting two-dimensional code. The gradients of bars arranged in parallel are found and line detection is executed based on the gradients. Thus, if a part of the bars is dirty, the line can be extracted correctly.

In the eighteenth two-dimensional code reader of the invention, the code detection means moves a scanning line position each time a new image is read. Whenever a new image is read, the scanning line position is moved in the detection process. Thus, if an edge of a feature pattern (recognition pattern) made up of lines for detecting two-dimensional code cannot be detected on the scanning line because of dirt, etc., in the first detection process, an edge in a clean part of the recognition pattern can be detected in the second detection process, the recognition pattern can be detected, and two-dimensional code can be detected.

DETAILED DESCRIPTION OF THE PREFERRED EMBODIMENTS

Figure 6:
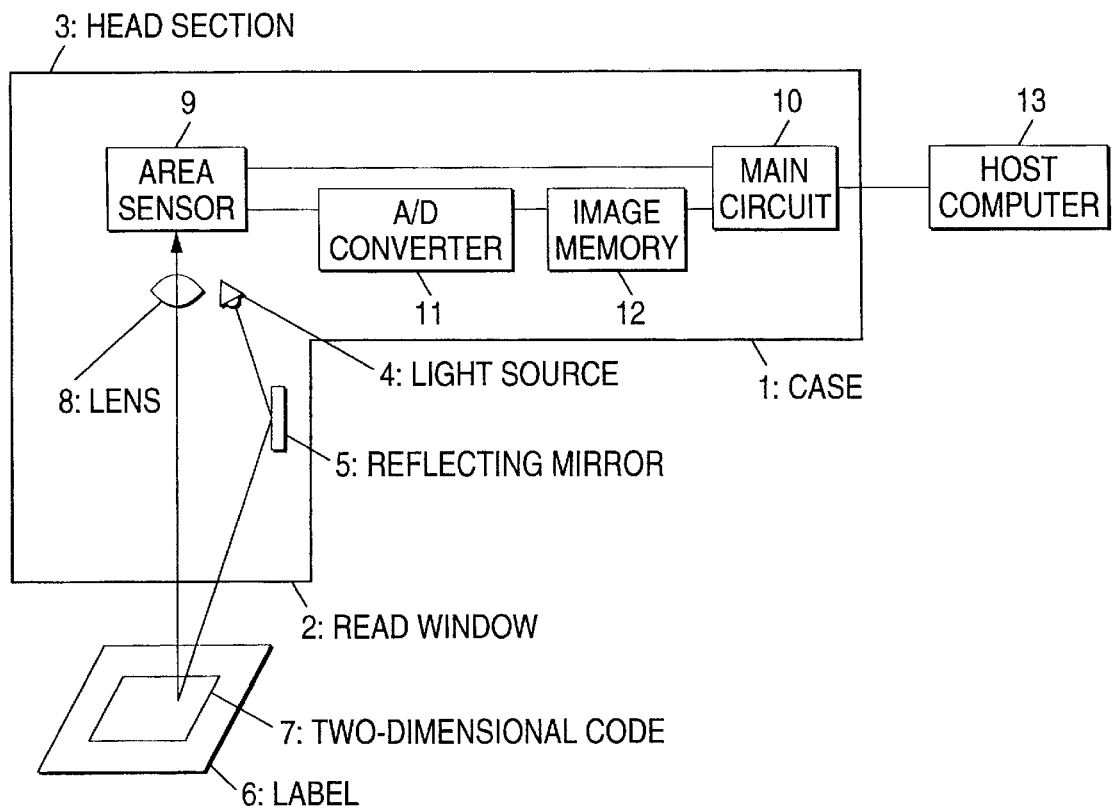
FIG. 6 is a block diagram of a touch two-dimensional code reader in embodiments of the invention.

The configuration of a touch two-dimensional code reader in embodiments of the invention will be discussed with reference to FIG. 6.

The touch two-dimensional code reader uses an area sensor 9 as a sensor, an A/D converter 11 as analog-digital conversion means, and a main circuit 10 as operation means.

A case 1 is formed at a tip with a read window 2. A light source 4 made up of, for example, a plurality of light emitting diodes (LEDs) is disposed in a head section 3 of the case. Illumination light from the light source 4 is reflected on a reflecting mirror 5, is output through the read window 2 to the outside of the case 1, and is irregularly reflected on two-dimensional code 7 printed on a label 6. The irregularly reflected light is again incident on the case 1 through the read window 2 and is projected on the area sensor 9 through a lens 8.

When the area sensor 9 receives a read request signal from the main circuit 10, it converts two-dimensional information projected through the lens 8 into an analog image signal and outputs the analog image signal. The image signal output from the area sensor 9 is converted into digital image information of 256 gradation by the A/D converter 11 and the digital image information is stored in an image memory 12. The main circuit 10 processes the image information stored in the image memory based on a program, decodes information coded into two-dimensional code, and transmits data to a host computer 13, etc.

Figure 7:
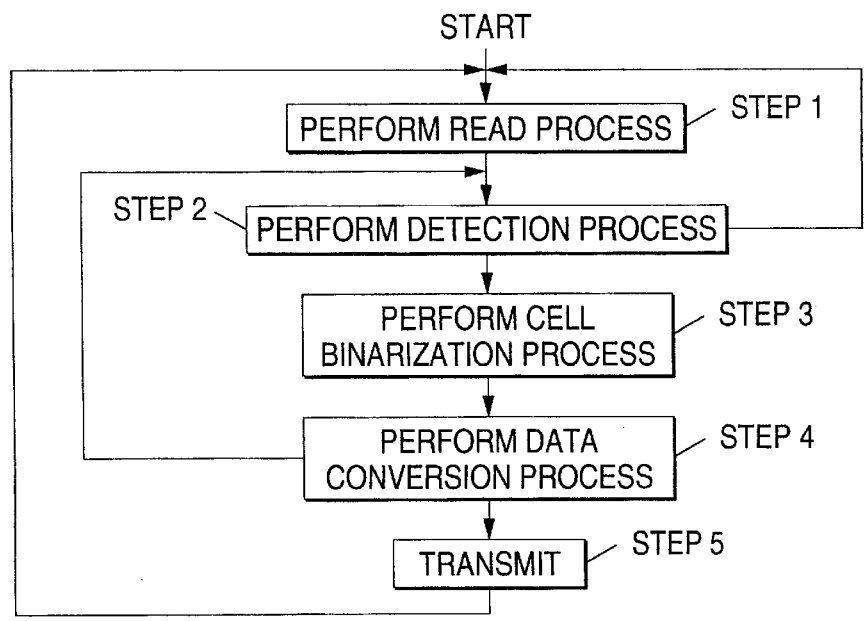
FIG. 7 is a process flowchart of the two-dimensional code reader in FIG. 6.

A processing flow of the main circuit will be discussed with reference to FIG. 7.

At step 1 (read process), the main circuit 10 issues a read request signal to the area sensor 9, which then outputs projected image information as an image signal. The output image signal is stored through the A/D converter 11 in the image memory 12. After all image information is output from the area sensor 9, a read completion signal is output from the area sensor 9 to the main circuit.

When the main circuit detects the read completion signal, it executes step 2 (detection process). In the detection process, the main circuit 11 reads a part of the image memory 12 and finds the position and orientation of two-dimensional code and the number of cells making up the two-dimensional code.

If the detection process becomes a success, the main circuit executes step 3 (cell binarization process). In the cell binarization process, the main circuit finds the positions of the cells from the position and orientation of the two-dimensional code and the number of cells making up the two-dimensional code found in the detection process, and accesses the image memory to find binary data of the cells.

If the binary data of the cells is found in the cell binarization process, then the main circuit converts the binary data into an ASCII code string based on a determined rule at step 4 (data conversion process). At this time, if an error in the binary data exceeds an allowable error and the conversion to the ASCII code becomes a failure, the main circuit returns to step 2 (detection process) and detects any other two-dimensional code. If it becomes impossible to detect two-dimensional code in the image memory, the main circuit returns to step 1 (read process).

If the data conversion process at step 4 becomes a success, the main circuit transmits the ASCII code string at step 5 and returns to step 1 (read process).

Next, two-dimensional code read through the two-dimensional code reader in the embodiments will be discussed.

Figure 8:
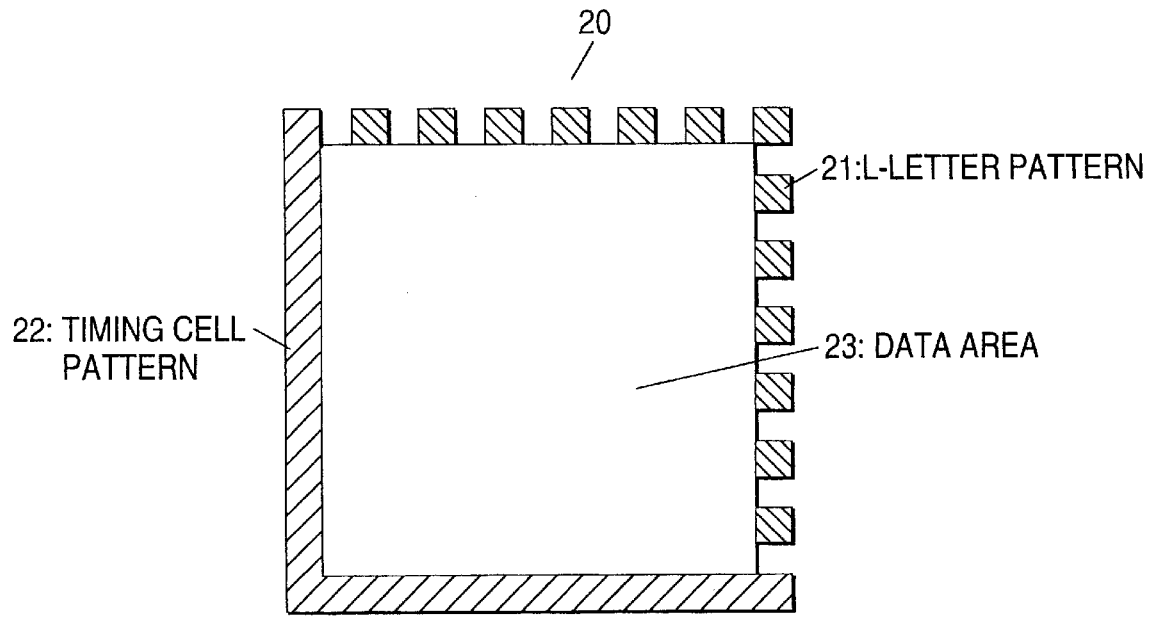
FIG. 8 is an illustration to show a two-dimensional code label (data matrix)

Two-dimensional code 20 (so-called data matrix) in FIG. 8 is made up of an L-letter pattern 21, a timing cell 22, and a data area 23. The L-letter pattern 21 is an L-letter pattern positioned on two outer sides of the two-dimensional bar code 20. The timing cell 22 is positioned on other two sides of the two-dimensional code than the L-letter pattern. The L-letter pattern is made up of all black cells and the timing cell consists of an alternating pattern of black and white cells. The data area 23 is surrounded by the L-letter pattern 21 and the timing cell pattern 22 and comprises cells arranged like a lattice. White and black cells in the data area represent data coded into the two-dimensional code 20.

Figure 9:
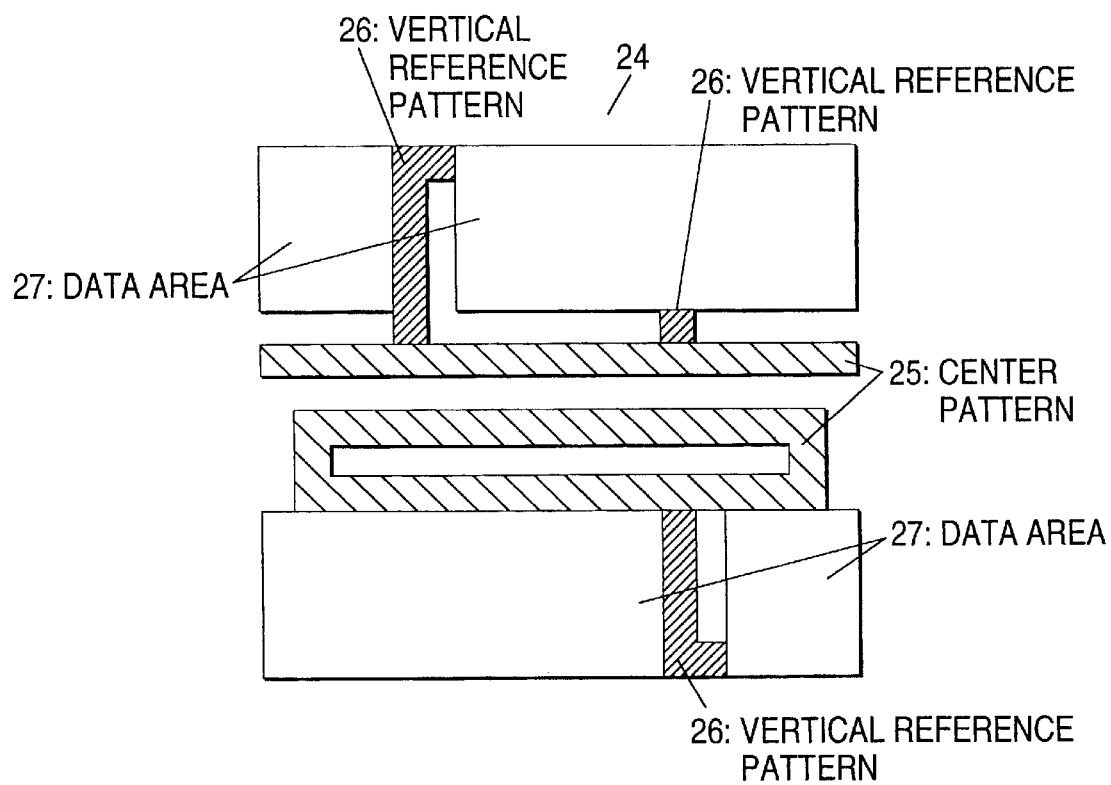
FIG. 9 is an illustration to show a two-dimensional code label (code 1)

Two-dimensional code 24 (CODE 1) shown in FIG. 9 is made up of a center pattern 25, vertical reference patterns 26, and data areas 27.

The center pattern 25, which is positioned at the center of the two-dimensional code 24, occupies a rectangular area long in the horizontal direction of the two-dimensional code 24 and comprises an alternating pattern of bars and spaces parallel with each other in the horizontal direction. A bar short in the vertical direction contacts ends of some of the horizontal bars. The bars and spaces almost equal in width, but may slightly differ in width depending on print conditions, etc. The numbers of vertical and horizontal cells of the two-dimensional code are determined by the number of bars of the center pattern 25 and the length of the vertically short bars. A plurality of vertical reference patterns 26 exist vertically at determined positions of the two-dimensional code 24 and one of the vertical reference patterns 26 is made up of a pair of a bar and a space. The data areas 27 are positioned above and below the center pattern 25 and the black and white cells in the data areas 27 represent data coded into the two-dimensional code 24.

Embodiment 1

Figure 10:
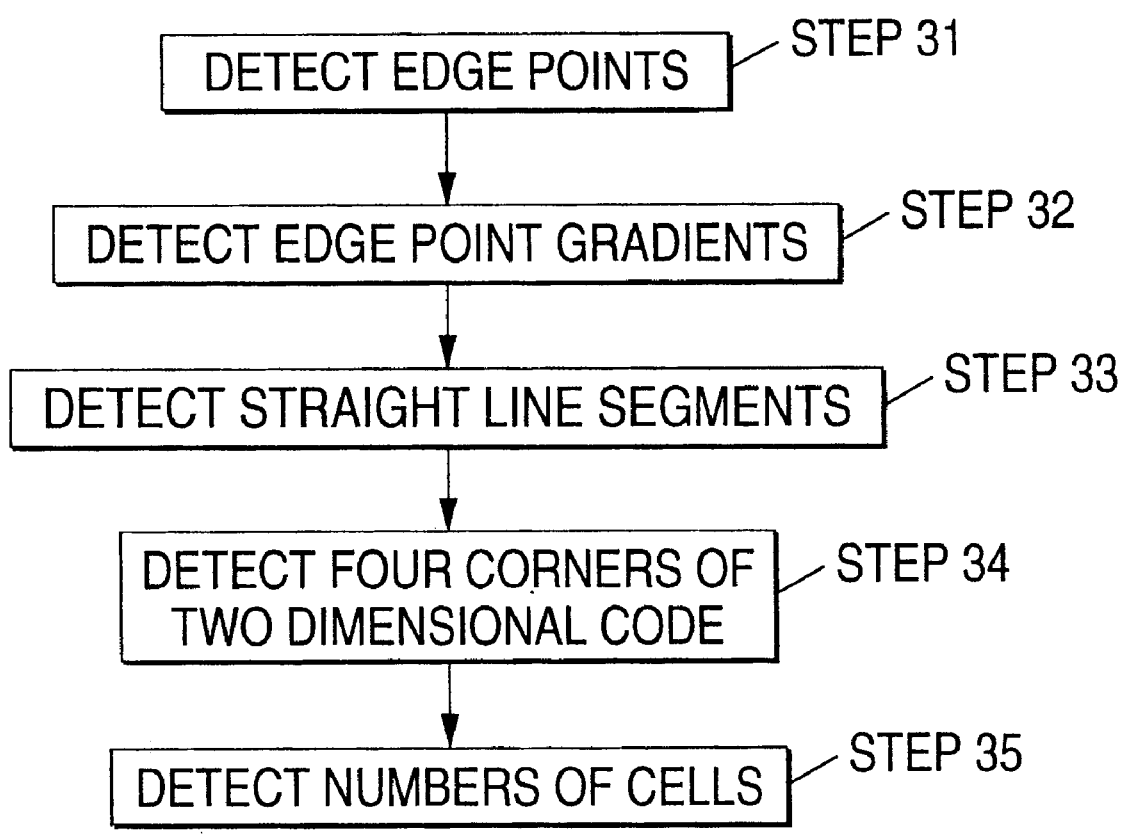
FIG. 10 is a flowchart to explain detection means of the two-dimensional code reader in a first embodiment of the invention.

FIG. 10 is a flowchart to explain detection means of the two-dimensional code reader in a first embodiment of the invention. The detection means of the two-dimensional code reader in the first embodiment of the invention will be discussed using the two-dimensional code 20 in FIG. 8.

First, a two-dimensional image area is scanned in longitudinal and lateral directions for detecting edge points at step 31. The scanning lines are spaced by given interval, whereby accessing the image memory is lessened and the processing time is shortened.

Figure 11:
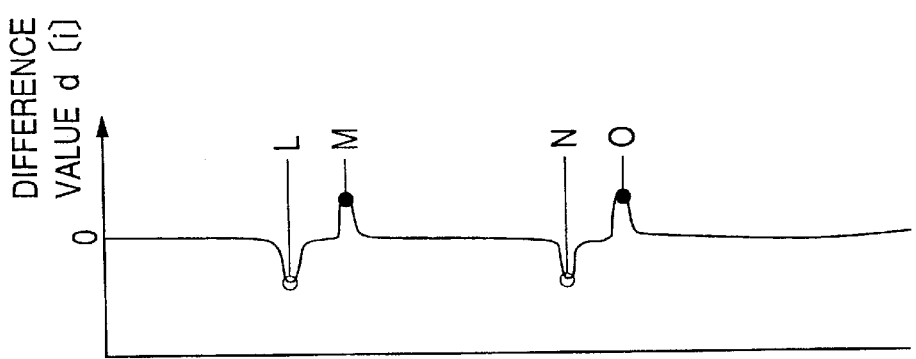
FIG. 11(a) is an illustration to show a scanning line for edge point detection.
FIG. 11(b) is an illustration to explain gray levels on the scanning line.
FIG. 11(c) is an illustration to show difference values.
Figure 11:
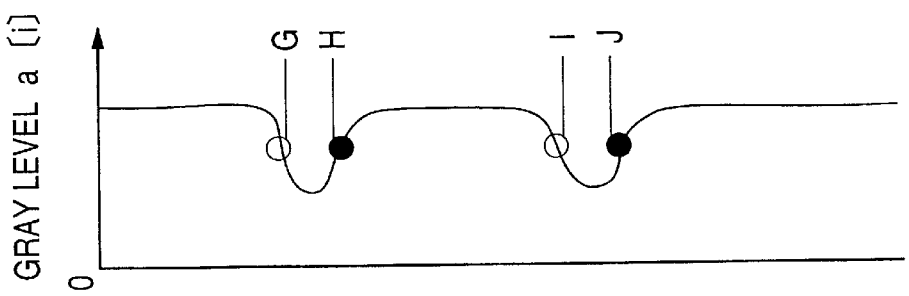
Figure 11:
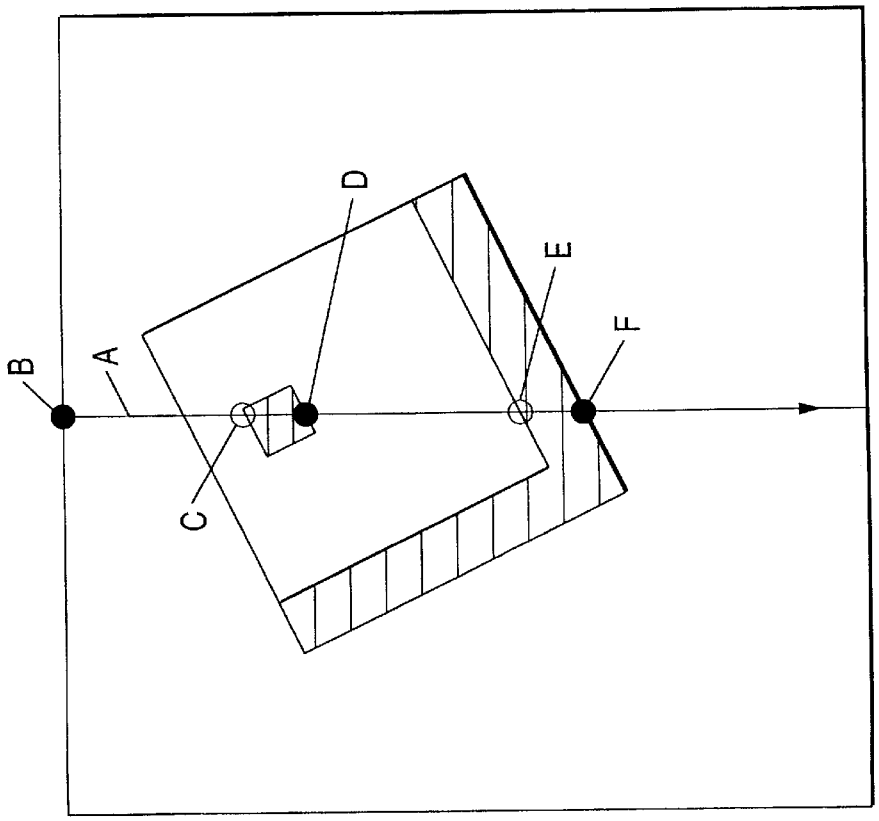

An edge point detection method will be discussed with reference to FIG. 11. For example, a 512×512-pixel image is scanned on 15 lines in the longitudinal direction and 15 lines in the lateral direction with a 32-pixel width. The gray levels of the pixels on each scanning line are read in row and are stored in a memory in the main circuit. Edge points are found from the stored gray levels.

The edge point detection method will be discussed below:

The gray levels of the pixels on scanning line A in FIG. 11(a) are stored in array a[i] in row. The gray levels take values of 256 gradation ranging from 0 to 255; the smaller the value, the darker the pixel and the larger the value, the lighter the pixel. FIG. 11(b) represents gray level a[i].

The value of i represents the number of an element of array a[i] and starting pixel B on the scanning line corresponds to i=0. From gray level a[i], difference value d[i] is found as $$d[i]=a[i+1]-a[i-1] \text{ where } i \text{ is } 1, 2, \ldots$$

Although the difference value with a 2-pixel interval in the embodiment, the interval may be one pixel or three or more pixels.

The difference value d[i] thus found becomes as shown in FIG. 11(c). i where the difference value d[i] becomes the maximum and i where the difference value d[i] becomes the minimum are found, whereby edge points on the scanning line are found.

Points M and O where the difference value d[i] becomes the maximum in FIG. 11(c) correspond to edge points D and F in FIG. 11(a). Points L and N where the difference value d[i] becomes the minimum in FIG. 11(c) correspond to edge points C and E in FIG. 11(a). At the point where the difference value becomes the maximum, the gray level becomes rising, that is, the point is an edge point changing from a black cell or bar to a white cell or space toward the scanning direction, represented as black dot ● in FIG. 11(a). At the point where the difference value becomes the minimum, the gray level becomes falling, that is, the point is an edge point changing from a white cell or space to a black cell or bar toward the scanning direction, represented as white dot ○ in FIG. 11(a).

The maximum and minimum values of the difference values d[i] are thus found from the gray levels on the scanning line, whereby the coordinates of two types of edge points are found.

Next, whether or not each edge point found at step 31 has a local gradient is determined and if the edge point has a local gradient, the gradient is found at step 32.

Figure 12:
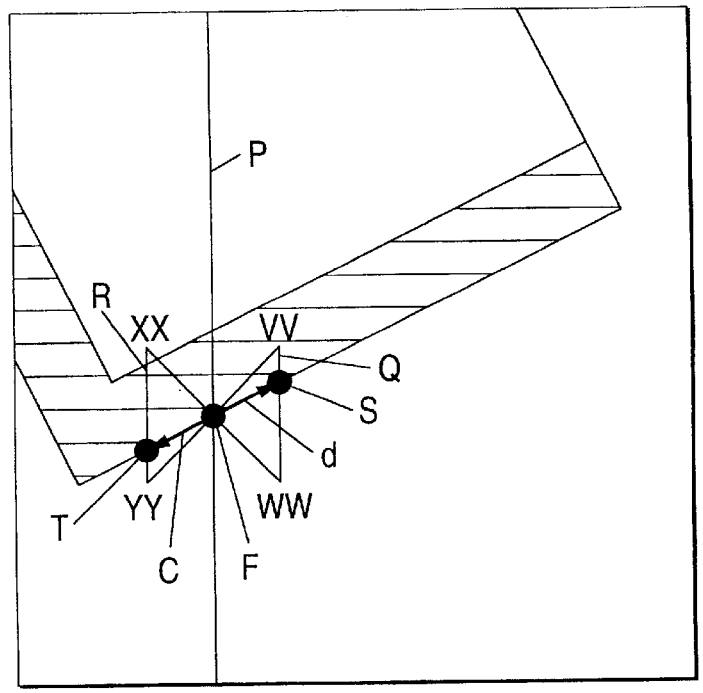
FIG. 12 is a first illustration to explain edge point gradient detection means.

To determine whether or not one edge point a has a local gradient, two edge points of the same type are detected in the proximity of the edge point a, the direction from the edge point a is found for each point, and whether the direction is the same or opposite is determined. The detection method of the local gradient of the edge point will be discussed with reference to FIG. 12.

Rising edge point F is detected at step 31. Short scanning lines Q and R parallel with scanning line P are drawn at the left and right of the edge point F and rising edge points S and T are detected on the scanning lines Q and R. The start and end points of the scanning line Q are determined points VV and WW and those of the scanning line R are determined points XX and YY so that when the edge point F has a gradient at an angle of 45–135 degrees with the scanning line P, the edge points S and T can be detected. If the edge points can be thus detected, then vectors c and d with the edge point F as the start point and the edge points S and T as the end points are found and whether or not the two vectors c and d equal in direction component is checked. If they almost equal in direction component, it is determined that the edge point F has a local gradient. The average value of the direction components of the two vectors is adopted as the gradient of the edge point F.

Figure 13:
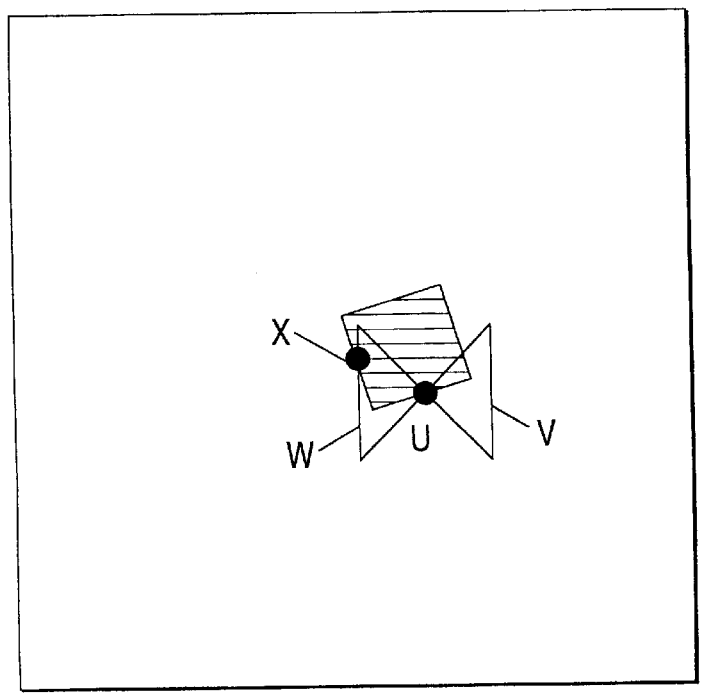
FIG. 13 is an illustration to show an example wherein no edge point gradient can be detected.

FIG. 13 shows an example wherein the gradient of an edge point cannot be detected. Scanning lines V and W are drawn in the proximity of edge point U. Edge point X of the same type can be detected on the scanning line W. However, no edge point can be detected on the scanning line V. In this case, the edge point detection becomes a failure. If two edge points of the same type can be detected on the two scanning lines, unless the vector directions are the same, no edge point gradient is detected. Only edge points whose gradient can be detected are detected, whereby detection of erroneous straight line segments is lessened and the processing time can be shortened.

Figure 14:
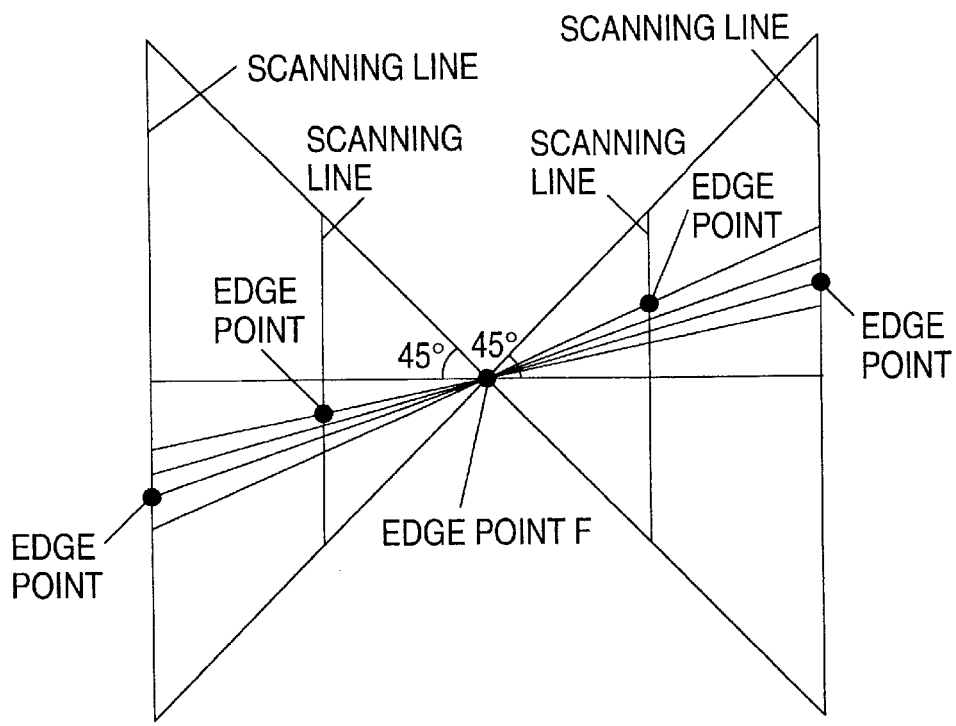
FIG. 14 is a second illustration to explain edge point gradient detection means.

As shown in FIG. 14, three or more edge points of the same type are detected in the proximity of edge point F and direction vectors of the edge points are found. If variations in direction vector gradients are a given value or less, the edge point is assumed to have a gradient and an average value may be found for detecting the edge point gradient.

At step 32, the edge point gradient detection is executed for all edge points.

Next, at step 33, edge points of the same type are detected every given interval in the edge point gradient direction from each edge point whose gradient is detected at step 32.

Figure 15:
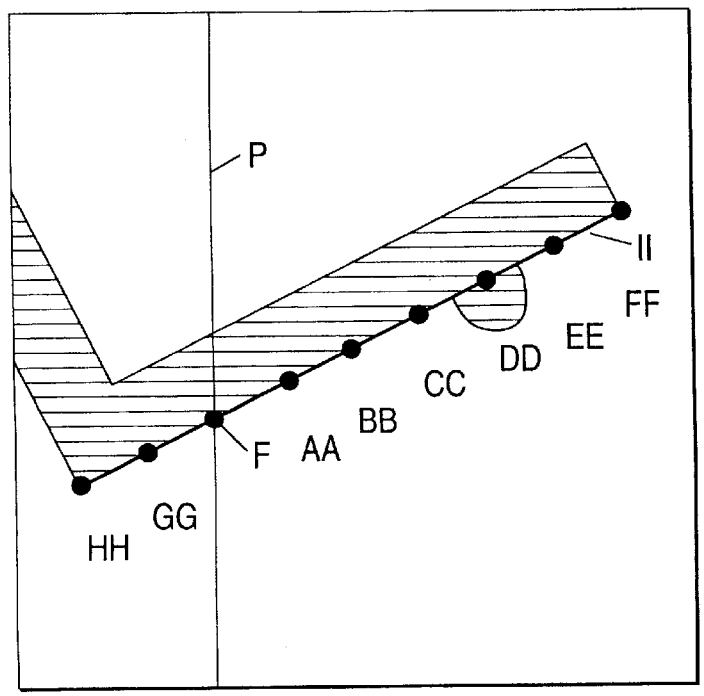
FIG. 15 is an illustration to explain line detection.

In FIG. 15, the gradient of the edge point F is detected. Edge points AA, BB, and CC are detected in the direction of the found gradient. If an edge is dirty like point DD and the edge point DD cannot be detected, an edge point is found with double interval in the same direction from the edge point CC and edge point EE is found. If the edge point EE is not found, an edge point is found with triple interval. If no edge point is found with a given distance or more, the process is terminated. The process is also executed in the opposite direction from the edge point F and edge points GG and HH are detected. The detected edge lines are related to straight line segments.

The process is executed for all edge points detected at step 32.

Figure 22:
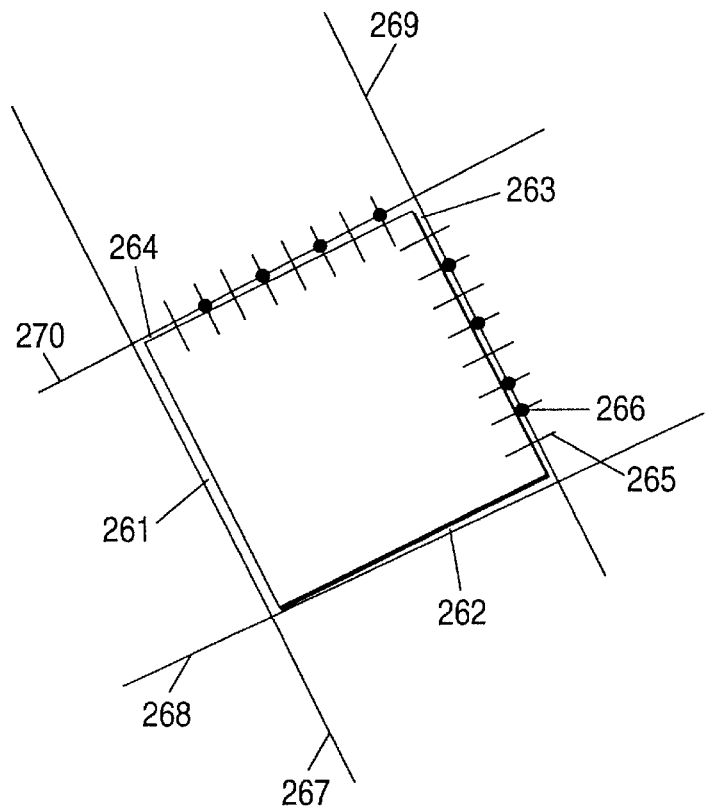
FIG. 22 is an illustration of how to find four corner points of two-dimensional code 20 in a first embodiment of the invention.
Figure 23:
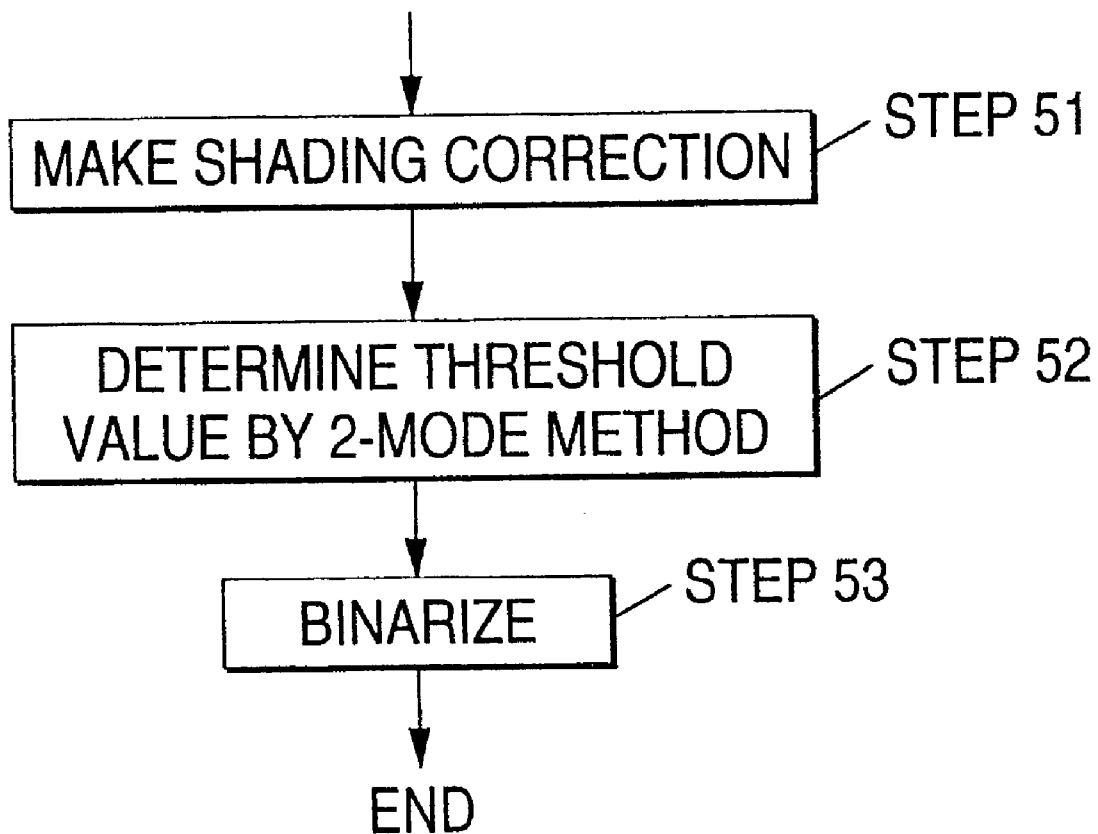
FIG. 23 is a flowchart of a conventional binarization method using software.
Figure 24A:
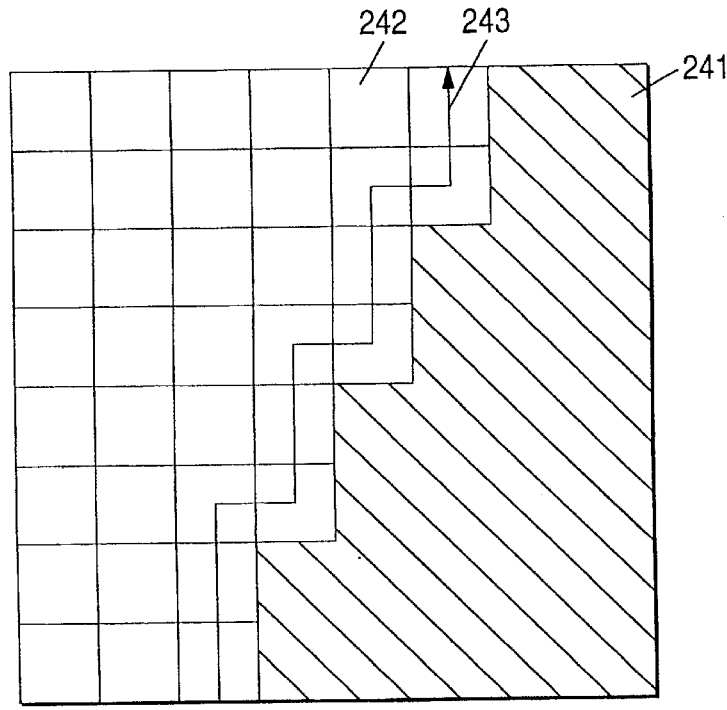
FIG. 24(a) is an illustration of conventional chain coding.
Figure 24B:
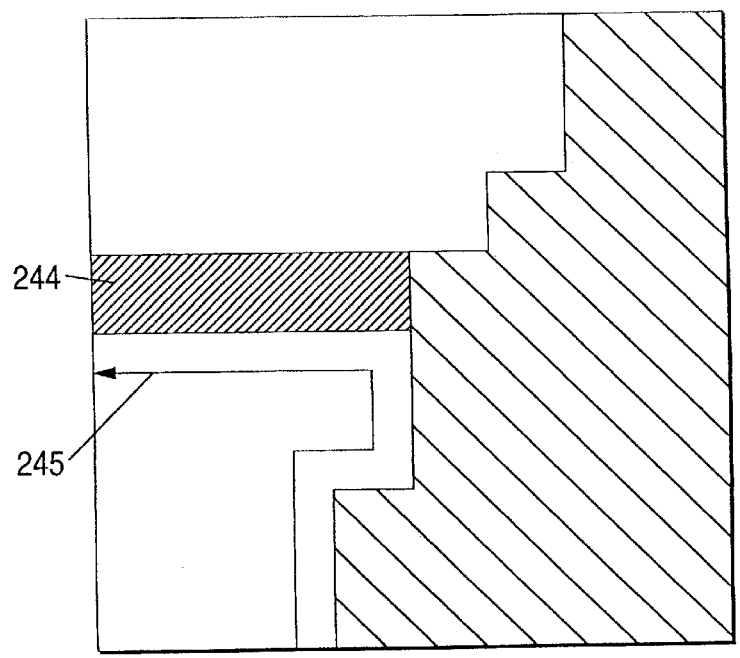
FIG. 24(b) is an illustration to show the fact that the conventional chain coding cannot normally be read.
Figure 25A:
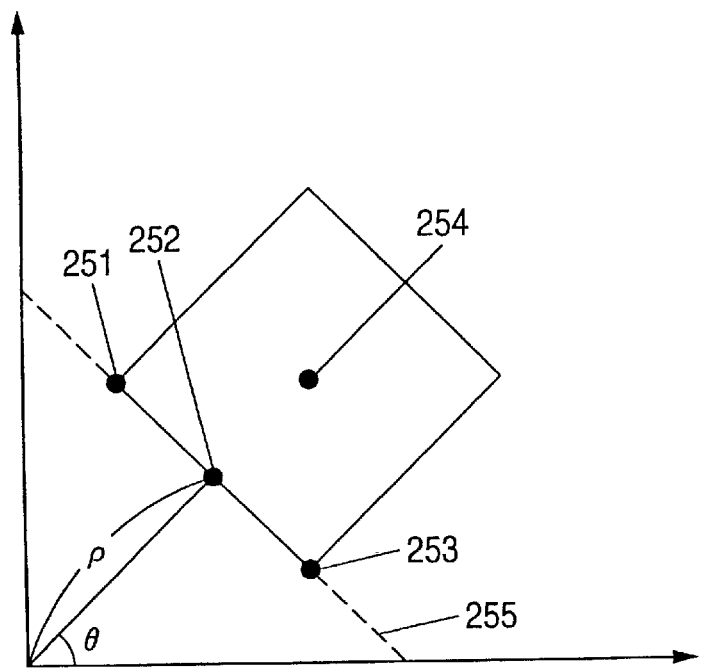
FIG. 25(a) is a first illustration of conventional Hough transformation.
Figure 25B:
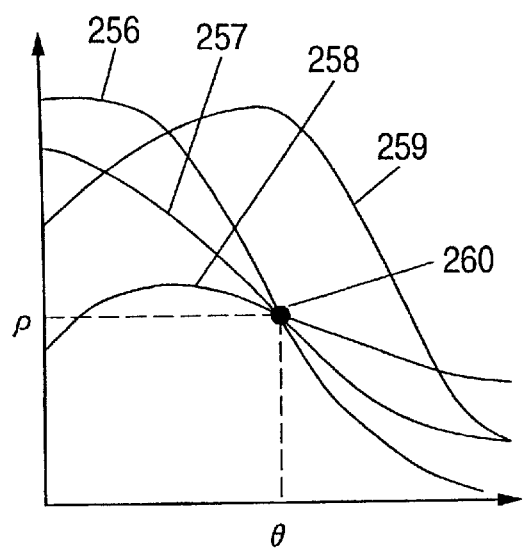
FIG. 25(b) is a second illustration of conventional Hough transformation.
Figure 26A:
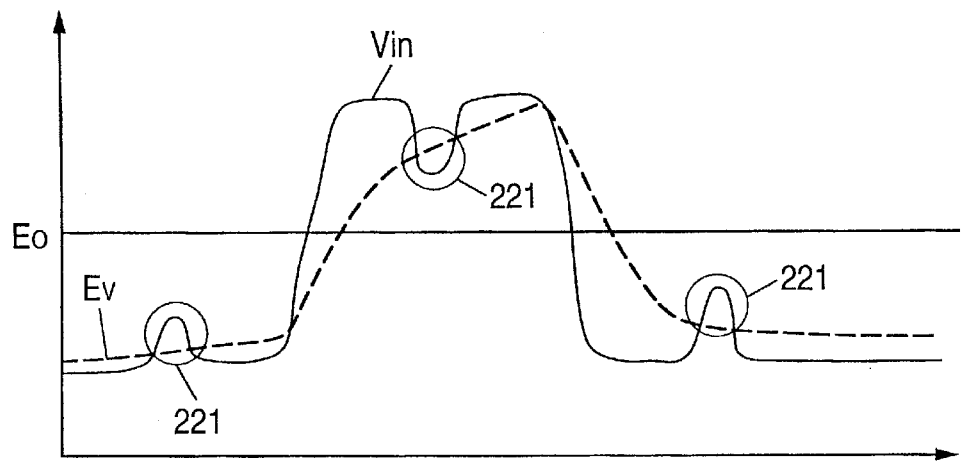
FIG. 26(a) is an illustration of conventional binarization threshold values.
Figure 26B:
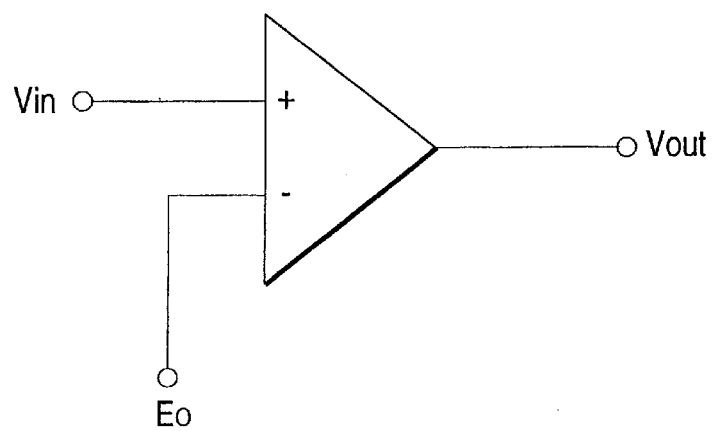
FIG. 26(b) is a diagram to show a binarization circuit with a fixed threshold value.
Figure 26C:
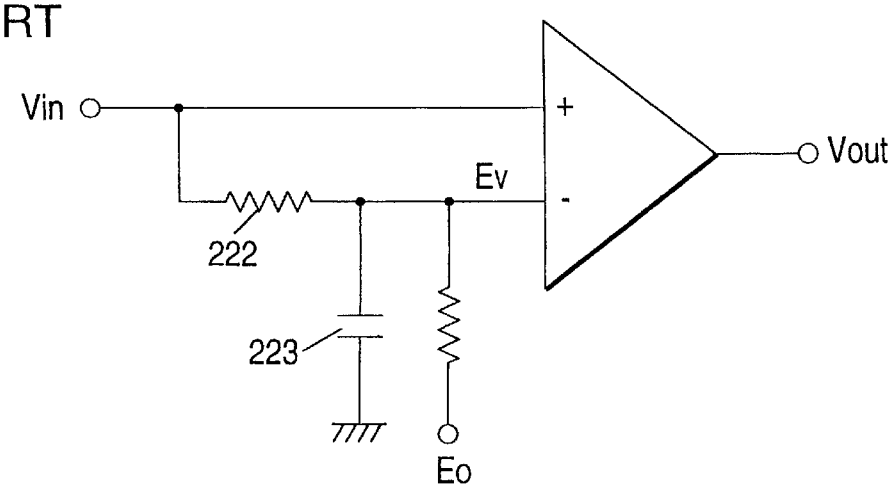
FIG. 26(c) is a diagram to show a binarization circuit with a floating threshold value.

Next, the coordinates of the four corners of the two-dimensional code 20 are found at step 34. One combination of lines crossing at right angles like 261 and 262 in FIG. 22 is found from the straight line segments found at step 33. End lines 263 and 264 which becomes opposite sides of a rectangle with the lines 261 and 262 as two sides are drawn and short scanning lines 265 each crossing one of the two end lines 263 and 264 perpendicularly are drawn for finding edges 266. At this time, two sides of the two-dimensional code 20 are the timing cell pattern having an alternating pattern of white and black cells, thus the scanning lines are separated into those on which edges can be detected and those on which edges cannot be detected. The detected edge points are related to the end lines 263 and 264. The edge points related to the straight line segments 261, 262, 263, and 264 are used as sample points to find four straight lines 267, 268, 269, and 270 by a least-squares approximation method. The four intersections of the four lines become the four corner points of the two-dimensional code 20.

The numbers of vertical and horizontal cells of the two-dimensional code are found at step 35. The number of cells can be found by counting the number of timing cells. To count the number of timing cells, the timing cells are scanned and the number of edges is counted. The numbers of vertical and horizontal cells can be counted by counting the number of timing cells on the two sides.

For two side lines of a detection pattern of the two-dimensional code 20, first the image memory is scanned vertically and horizontally with a wide interval so that edges are found, next the gradients of the edges are found and lines are traced in the edge gradient direction, last the least-squares approximation method is used to detect lines, whereby the two-dimensional code 20 can be detected at high speed in a short processing time as compared with the line extraction using the Hough transformation as in the conventional method. If dirt exists on the two lines of the detection pattern of the two-dimensional code 20, an edge gradient is found from an edge in a clean portion on the line is found and an edge is traced based on the edge gradient. The dirt portion is skipped and tracing is continued for detecting lines, whereby the two-dimensional code can be detected precisely. Edges are found directly from multi-valued image information rather than a binarized image employed in the conventional method, thus can be extracted precisely although luminance unevenness, etc., exists.

In the first embodiment, detection of two-dimensional code having an L-letter pattern like the two-dimensional code 20 is taken as an example. Likewise, two-dimensional code having all bars (black cells) on four sides can also be detected. In this case, the bars on the four sides are all extracted at step 33 and the coordinates of the four corners can be detected easily from the information.

Embodiment 2

Figure 16:
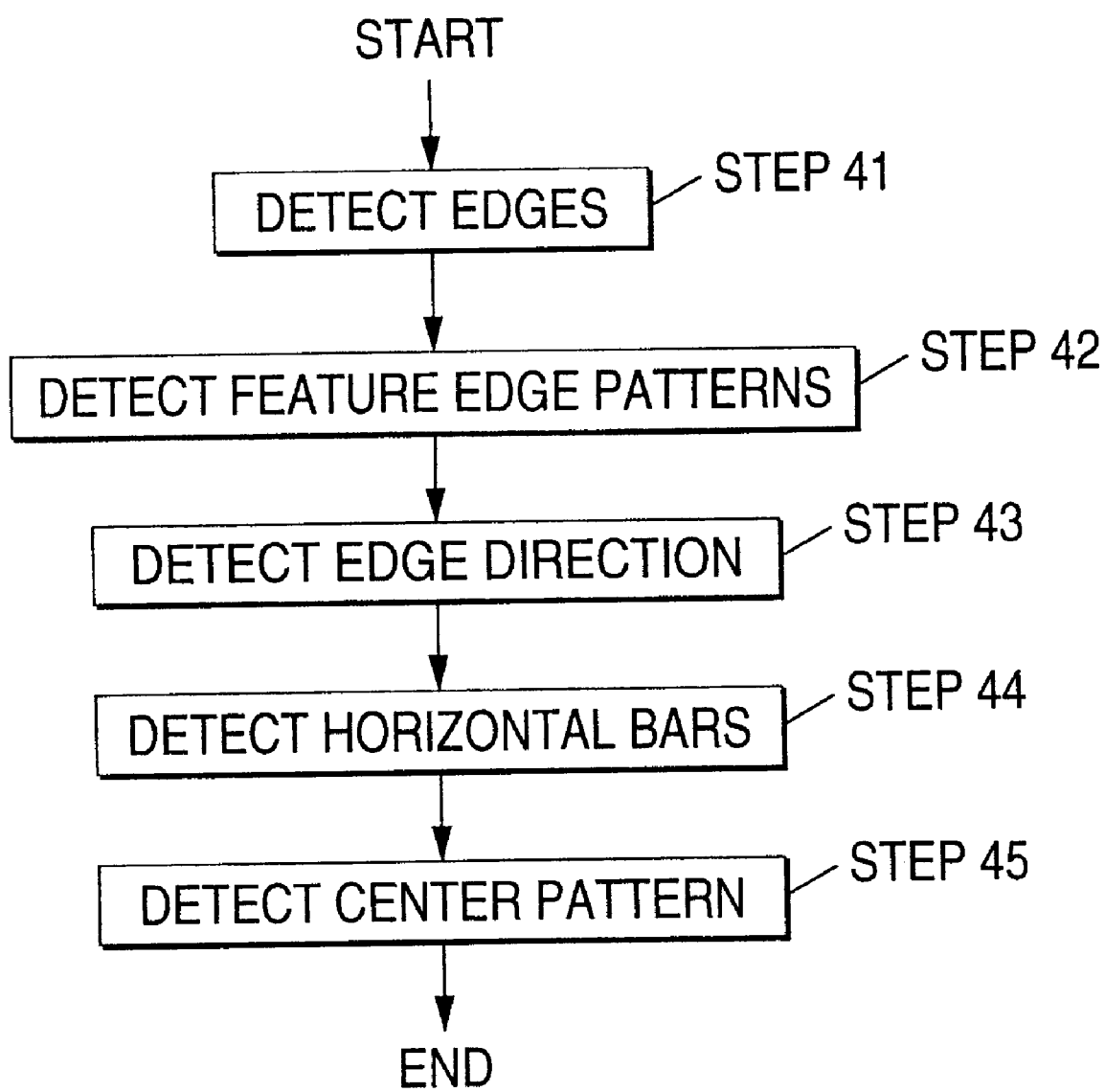
FIG. 16 is a flowchart to explain detection means of the two-dimensional code reader in a second embodiment of the invention.

FIG. 16 is a flowchart to explain detection means of the two-dimensional code reader in a second embodiment of the invention. The detection means of the two-dimensional code reader in the second embodiment of the invention will be discussed using the two-dimensional code 24 in FIG. 9.

First, a two-dimensional image area is scanned in longitudinal and lateral directions for detecting edge points at step 41. The scanning lines are spaced by given interval, whereby accessing the image memory is lessened and the processing time is shortened.

Figure 17:
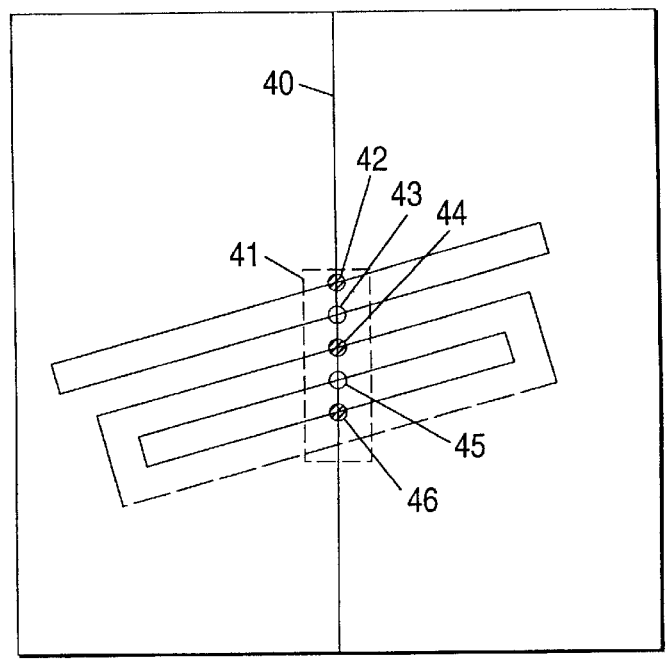
FIG. 17 is an illustration to explain feature edge pattern detection.

Next, at step 42, a part which crosses the center pattern is detected based on coordinate information of the edges and information of the edge type (○ or ●) found at step 41. If a scanning line crosses the center pattern, two types of edges appear alternately in a given cycle on the two-dimensional code 24, as shown in FIG. 17. At this time, the bars and spaces may differ in thickness depending on print conditions of two-dimensional code. Therefore, in the embodiment, edges are determined as being arranged on the scanning line crossing the center pattern if edges of the same type are equally spaced from each other, and then the coordinates of the edges and the edge type are stored.

In FIG. 17, assuming that the distance between points 42 and 44 is d1, that the distance between points 43 and 45 is d2, and that the distance between points 44 and 46 is d3, it is recognized that a row of these edge points corresponds to a part crossing the center pattern if the distances d1, d2, and d3 are almost equal to each other.

Figure 18:
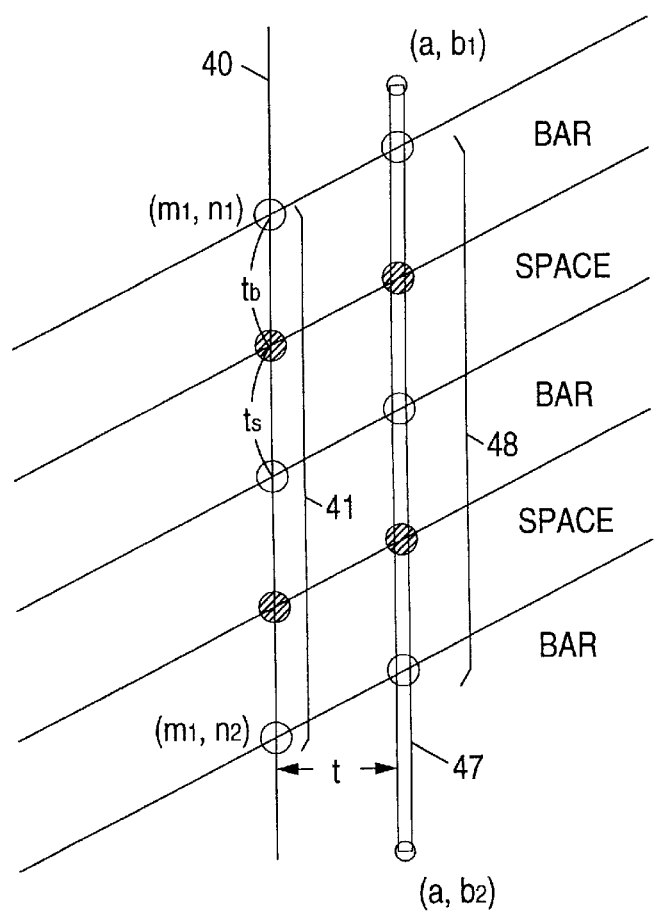
FIG. 18 is an illustration to explain center pattern gradient detection.

Next, at step 43, an edge point row 48 is detected in the proximity of the edge point row 41, which has equal gradients of vectors connecting related edges between the edge point rows 41 and 48, found at step 42, whereby a gradient of the center pattern is found. More specifically, a short scanning line 47 parallel with a scanning line 40 is drawn in the proximity of the edge point row 41 found at step 42, and edges on the scanning line 47 are found by a method similar to that at step 41. The found edge points are related to the edge points of the edge point row 41 found at step 42 in a one-to-one correspondence. The nearest edges of the same type are related to each other. The vector of the line connecting the related edges is defined as an edge gradient vector (t, ui) where i is the edge number. In FIG. 18, five edge points exist, thus five gradient vectors are found. The center pattern direction is found from the average value of ui. Although the center pattern direction is found from the average value of ui in the embodiment, a histogram of ui is found and the value occurring most frequently may be adopted as the center pattern direction. At this time, if the variations in ui are large, the detection is assumed to be a failure and the process may be again executed starting at step 42.

The start point (a, b1) and end point (a, b2) of the scanning line for finding gradient vectors are found as follows: First, average value of bar thickness, tb, and average value of space thickness, ts, are found from the coordinates of the edges found at step 42. tb or ts, whichever is the smaller, is used as interval between the scanning lines 40 and 47, t. Assume that the coordinates of the top one of the edges found at step 42 are (m, n1) and that the coordinates of the bottom edge are (m, n2). At this time, (a, b1) and (a, b2) are found as follows:

$$a=m+t$$

$$b1=n1-t$$

$$b2=n2+t$$

The greater the value of t, the more accurately found the edge direction. However, if the value of t is too much large, the edges on two scanning lines cannot be related to each other. t may be less than (tb+ts)/2. When t is determined by the above method, the edges can be related to each other even if the rotation angle becomes 45 degrees.

Figure 19:
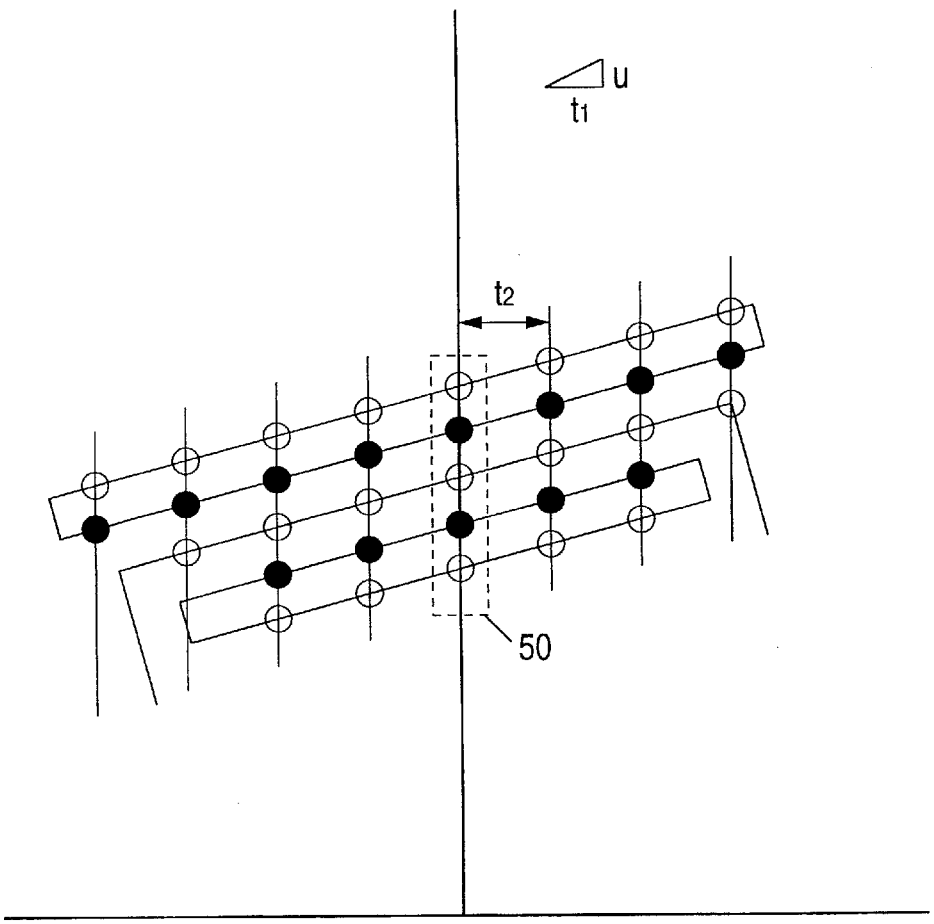
FIG. 19 is an illustration of edge tracing.

Next, edges of the same type are traced in accordance with edge gradient vector (t, u) found at step 43 from the coordinates of the edges found at step 42, and edges on the boundaries between the horizontal bars and spaces of the center pattern are found at step 44. Specific processing will be discussed below:

FIG. 19 shows edge tracing at step 44. Numeral 50 is the edge point row found at step 42. A scanning line is moved horizontally by t2 from the edge point row and edges on the scanning line are detected. To detect the edges, a method similar to that described at step 41 may be used. After the edges are detected on the scanning line, the found edges are related to the edges of the edge point row 50 based on edge gradient (t1, u). After this, the scanning line is furthermore moved right by t2 and edges on the scanning line are detected and related to the edges on the just preceding scanning line. If two or more edges can be related, tracing continues to be executed; otherwise, tracing in the right direction is terminated. Similar processing is also performed from the edge point row 50 in the left direction.

Figure 20:
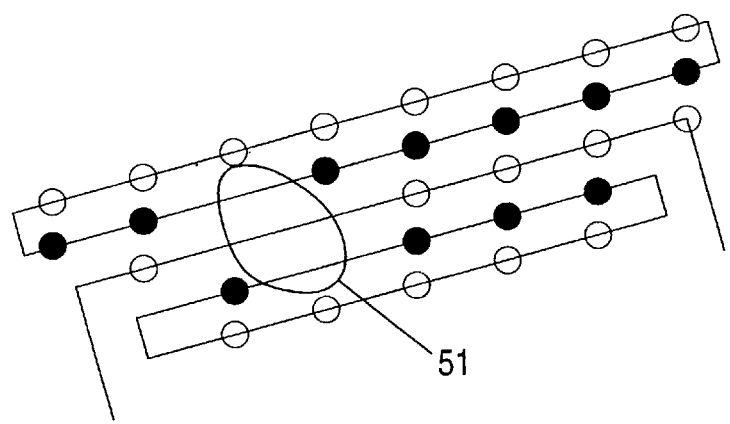
FIG. 20 is an illustration to explain dirt of center pattern.

The edges are thus traced, whereby correct edge points can be traced even if dirt 51 exists on the center pattern as in FIG. 20.

The related edge points correspond to points on the boundaries between the horizontal bars and spaces of the center pattern.

The least-squares approximation method is used to accurately find line segments with the found edge points on the boundaries as sample points.

At step 45, edges are detected in the extension direction of the end lines of the boundaries between the horizontal bars and spaces of the center line found at step 44 and the position and the rotation angle of the center pattern are found. The numbers of vertical and horizontal cells of the two-dimensional code 24 can be found from information of the number of boundaries of the center pattern.

As described above, first, the image memory is scanned vertically and horizontally with a wide interval for finding edges, next an edge point row comprising edges of the same type equally spaced from each other is detected, and further edges are detected in the proximity of the detected edge point row, whereby the gradient of the center pattern is found and edges are traced based on the center pattern gradient. Last, the least-squares approximation method is used to detect lines for detecting the center pattern, whereby the two-dimensional code 24 can be detected at high speed in a short processing time as compared with the line extraction using the Hough transformation as in the conventional method.

Even if dirt exists on the center pattern of the two-dimensional code 24, the center pattern gradient is found in a clean portion and lines are detected, thus the two-dimensional code 24 can be detected precisely. Edges are found directly from multi-valued image information rather than a binarized image as in the conventional method, thus can be extracted precisely although luminance unevenness, etc., exists.

In the second embodiment, at step 42, the edges are related to each other and gradients are found. However, for example, the edge point row on the scanning line 40 in FIG. 18 is used as a basic pattern and a pattern matching the basic pattern to a high degree is detected on the scanning line 47, whereby the center pattern gradient is found and edge point rows highly matching the basic pattern are detected in row in accordance with the center pattern gradient. This method, which uses pattern matching, is resistant to dirt and flaws and can detect the center pattern with high accuracy.

Embodiment 3

Detection processing in the two-dimensional bar code reader of a third embodiment of the invention will be discussed with reference to FIGS. 7, 16, and 21 by taking the two-dimensional code 24 as an example.

Figure 21:
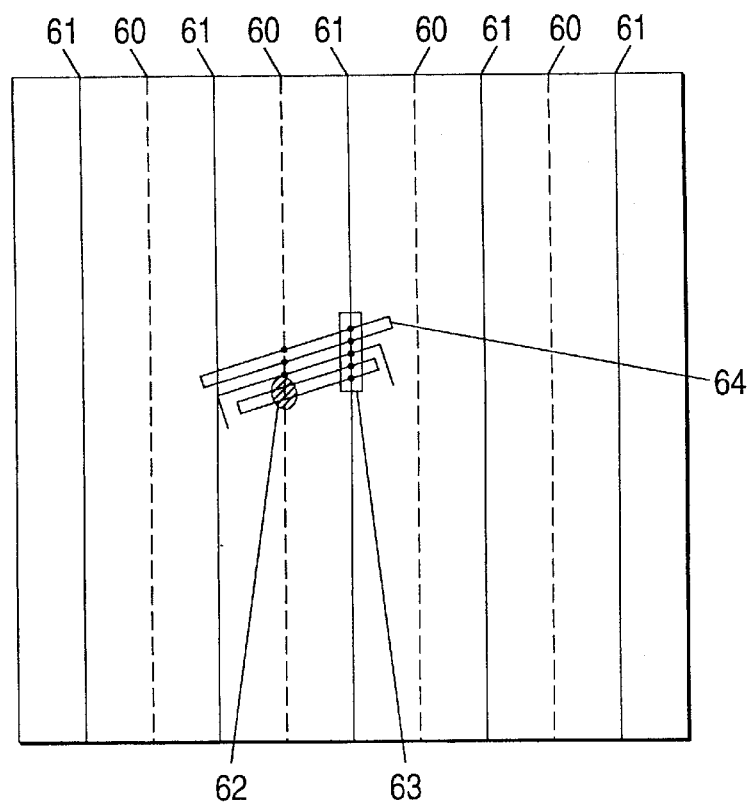
FIG. 21 is an illustration of scanning in a third embodiment of the invention.

First, step 1 (first read process) is executed, then step 41 (edge detection process) and step 42 (feature edge pattern detection process) are executed on a scanning line 60 in FIG. 21 at step 2 (detection process). However, the symbol in the example contains dirt 62 and a part where edges of the same type are spaced constantly from each other cannot be detected, thus the read process is again executed, then the detection process is executed. In the detection process, the scanning line position is changed and the edge detection process is again executed on a scanning line 61. At this time, since the scanning line position is changed, a part 63 where edges of the same type are spaced constantly from each other can be detected in the feature edge pattern detection process and a center pattern 64 can be detected. The scanning line position is thus moved, whereby dirty code or small code can be reliably read with the scanning line interval remaining large.

Thus, according to this method, flawed code or small code can be reliably read by decoding several times.

Embodiment 4

The two-dimensional code reader of a fourth embodiment of the invention will be discussed.

In the embodiment, detection means finds the coordinates of the four corners of two-dimensional code (or the coordinates of the four corners of the center pattern in case of the two-dimensional code 24) and the numbers of vertical and horizontal cells of two-dimensional code and cell binarization means finds binary data of cells based on the information.

In the conventional method, all pixels are binarized before two-dimensional code is detected by the detection means, the pixels at the center points of the cells are determined based on the information provided by the detection means, and the image memory addresses corresponding to the pixels are accessed, whereby cell binary data is found.

However, to provide high-speed detection means not affected by luminance unevenness in the two-dimensional code reader of the embodiment, two-dimensional code is detected from multi-valued image information. Thus, if the image memory addresses corresponding to the pixels at the center points of the cells are accessed, multi-valued gray levels of the pixels are only obtained. Therefore, the obtained gray levels of the center pixels of the cells need to be binarized by some method.

To binarize the gray levels of the pixels at the center points of the cells, for example, the average value of the maximum and minimum values of the gray levels of all pixels in a detected area may be used as a threshold value to binarize the center pixels of the cells.

However, this method, which accesses all pixels in the area, takes processing time. If luminance unevenness, etc., is caused by the effect of application of illumination, normal binarization cannot be executed.

Then, the cell binarization means of the two-dimensional code reader of the embodiment finds a binarization threshold value only from the gray levels of the pixels at the center points of the cells, thereby shortening the processing time. The two-dimensional code area is divided into small areas, a local threshold value is found for each small area, and binary data of cells are found, thereby making it hard to receive the effect of luminance unevenness.

Figure 1:
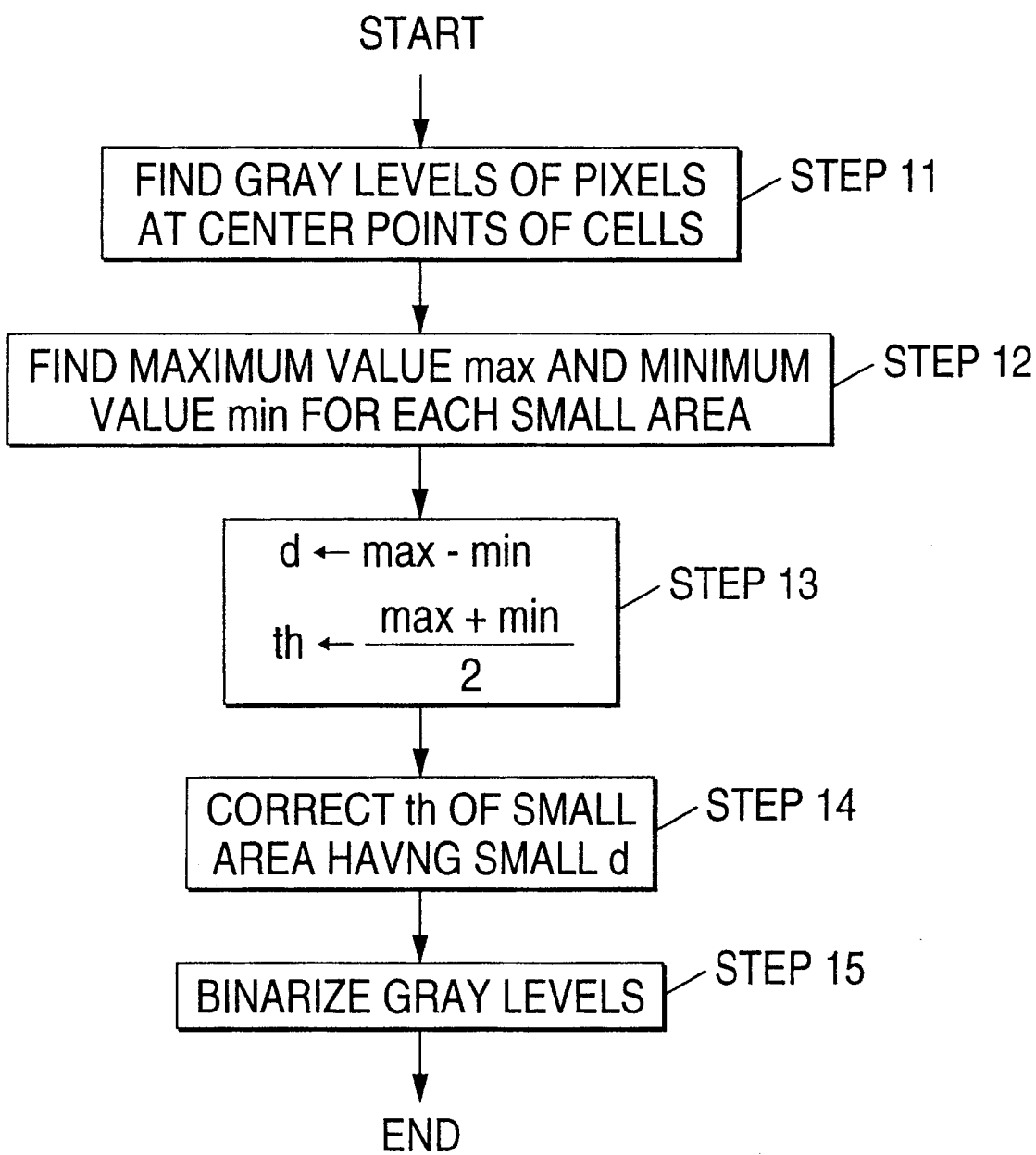
FIG. 1 is a flowchart of cell binarization means in a fourth embodiment of the invention.

A processing flow of cell binarization will be discussed with reference to FIG. 1.

Figure 2:
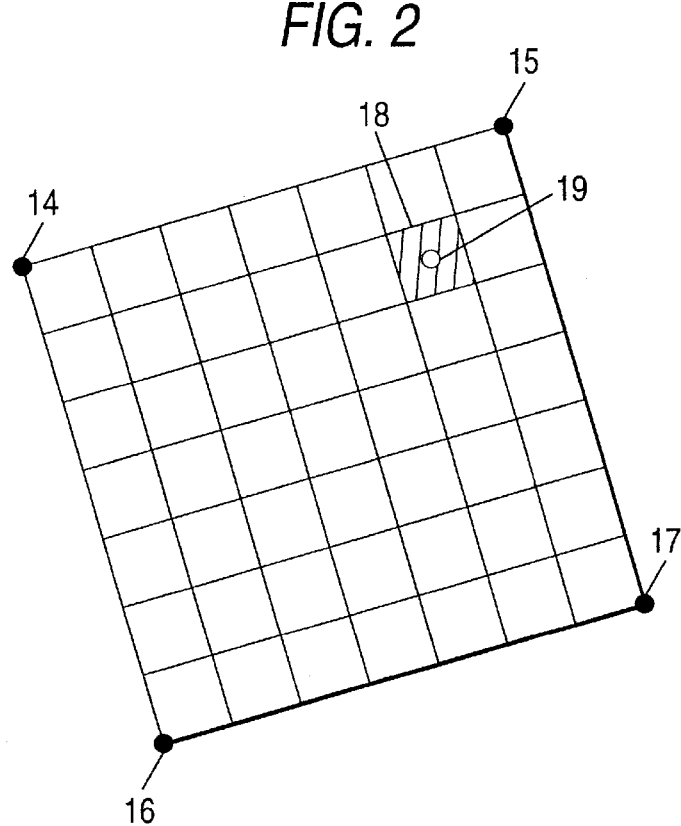
FIG. 2 is an illustration of a pixel at the center of a cell.

The information provided by a detection process is made up of the positions of four corner points 14, 15, 16, and 17 and the numbers of vertical and horizontal cells of two-dimensional code, as shown in FIG. 2. From the information, the position of a center pixel 19 of each cell 18 is found, and the gray level of the pixel at the position is stored in row at step 11.

Figure 3:
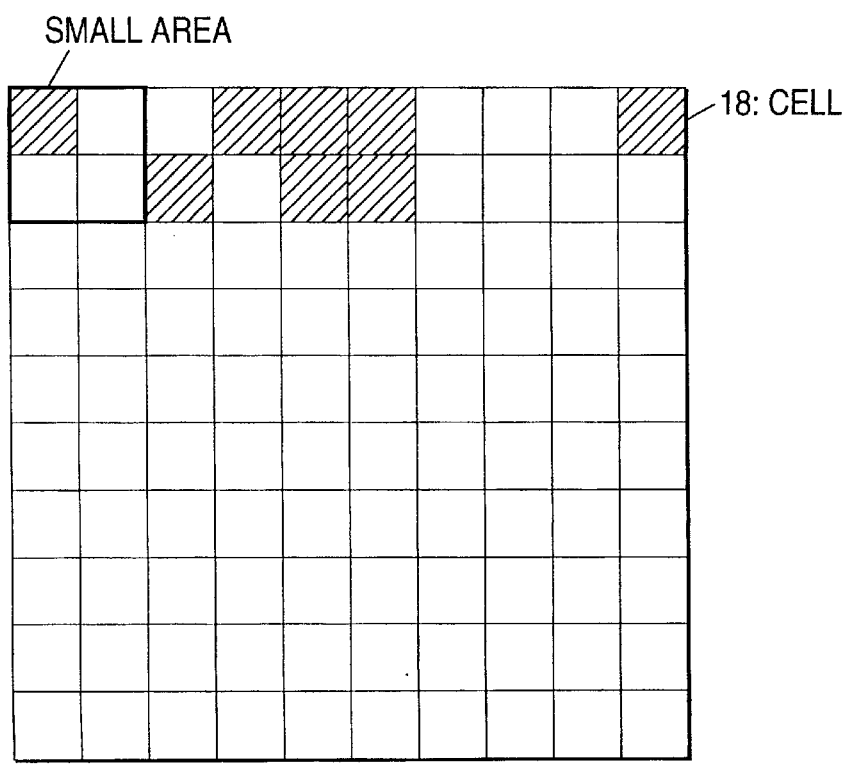
FIG. 3 is an illustration of a small area consisting of 2×2 pixels.

Next, the detected two-dimensional code is divided into small areas each consisting of several vertical and horizontal cells (in the example, 2×2) as shown in FIG. 3, and the maximum value max and the minimum value min of the gray levels for each small area are found at step 12 from the gray levels of the center pixels of the cells found at step 11.

At step 13, threshold value th and amplitude d for each small area are found based on the maximum value max and the minimum value min found at step 12.

The threshold value th for each small area is found from the maximum value max and the minimum value min of the gray levels of the pixels at the center points of the cells in the small area. The amplitude d is found from the difference between max and min.

The values of amplitude d of the adjacent small areas are compared for detecting a small area having a small value of amplitude d as compared with the surrounding small areas. Next, the threshold value th of the detected small area is found from the average value of the threshold values th of the adjacent small areas.

Here, the reason why the amplitude d of the small area is compared with the amplitude d of the adjacent small areas is to determine whether or not the small area contains all black or white cells. If the small area contains all black (or all white) cells, the threshold value found in that small area cannot be used for correct binarization. Thus, the threshold value of such a small area is found using the threshold value of the small area containing both white and black cells among the adjacent small areas, whereby precise binarization can be executed.

Last, the gray level of the pixel at the center point of each cell is binarized according to the threshold value th of the small area containing the cell at step 15.

Figure 4:
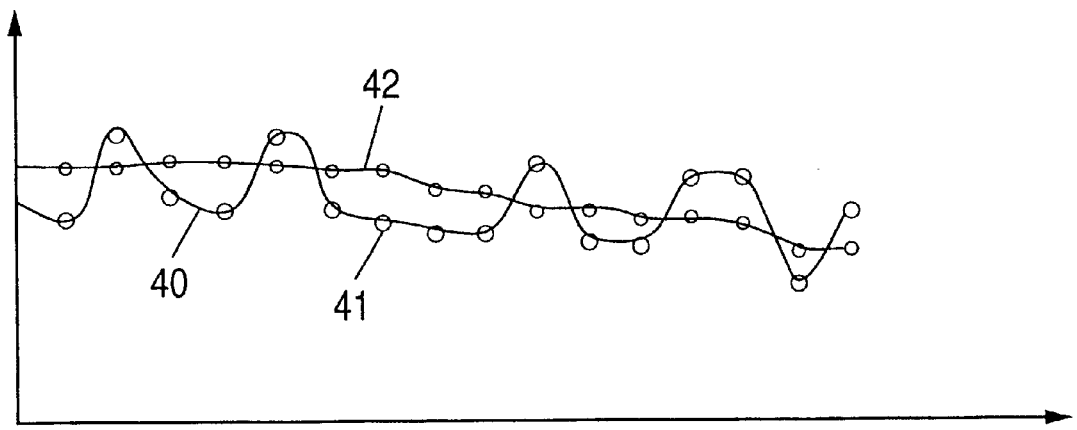
FIG. 4(a) is a first illustration of how to find a threshold value.
FIG. 4(b) is a second illustration of how to find a threshold value.
Figure 4:
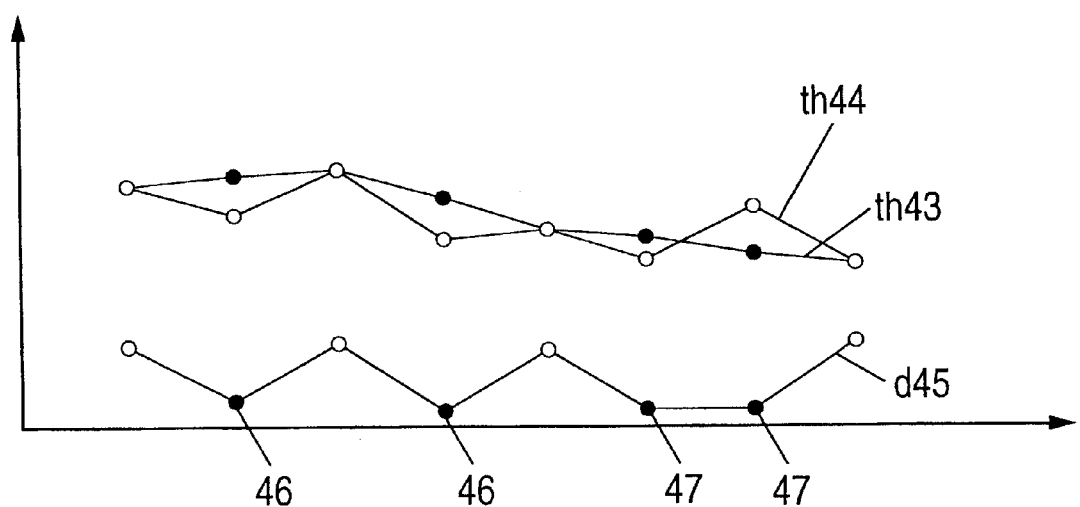

A specific example of the fourth embodiment will be discussed with reference to FIG. 4. Here, each small area consists of 2×1 cells. Small areas adjacent an attention small area are a left area and a right area.

Numeral 40 in FIG. 4(a) represents the gray levels of the pixels on a scanning line passing through the center pixels of the cells of two-dimensional code. On the waveform, shading basically lowering rightward on the base occurs and a fixed threshold value cannot be used for correct binarization.

In the method of the embodiment, first at step 11, gray level 41 of the center pixel of each cell is found. Next, at step 12, the maximum value max and the minimum value min of each small area are found. At step 13, the difference between the maximum value max and the minimum value min, d45, and the average value of the maximum value max and the minimum value min, th44, are found from the values found at step 12. At step 14, if d of the attention small area is a half or less of the maximum value of d of two adjacent small areas, it is determined that the attention small area contains black or white cells only, the small area is labeled like 46, 47, and the value of th of the labeled small area is found by interpolation of th of the small areas adjacent the small area like 46. If two small areas are labeled consecutively like 47, th is interpolated by interpolation of th of the adjacent small areas. As a result, it becomes a value indicated by th43 in FIG. 4. This value becomes a value indicated by 42 in FIG. 4(a).

Here, each small area consists of 2×1 cells. However, any number of cells may make up each small area. The number of cells making up each small area may be changed depending on the number of pixels corresponding to one cell. The small areas may overlap each other. In the description made above, comparison of the difference d between the maximum value max and the minimum value min is made in the right and left small areas, but may be made in four directions of top and bottom and left and right.

The gray levels of the pixels at the center points of the cells are found, a local threshold value is found only from the gray levels of the pixels at the center points, and the gray levels of the pixels at the center points of the cells are compared with the local threshold value for binarization, whereby cell binarization processing taking a short processing time and not affected by luminance unevenness can be performed.

Embodiment 5

In a fifth embodiment of the invention, if a detected two-dimensional code area does not contain luminance unevenness or monochrome contrast is strong, cells are binarized according to a given threshold value and if a detected two-dimensional code area contain luminance unevenness and monochrome contrast is weak, cells are binarized by a similar method to that of the first means.

Figure 5:
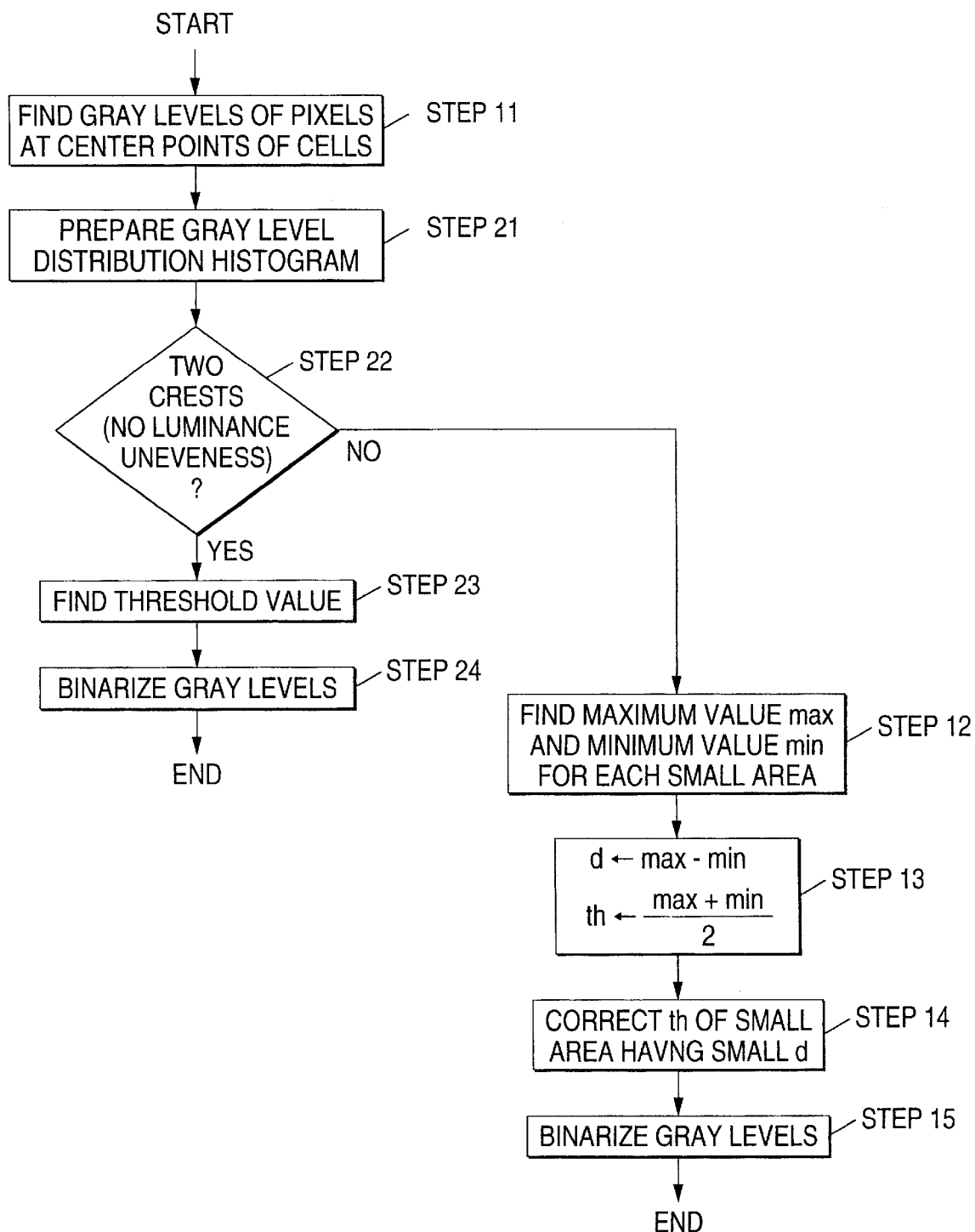
FIG. 5 is a flowchart of cell binarization processing in a fifth embodiment of the invention.

FIG. 5 is a flowchart of cell binarization processing in the fifth embodiment of the invention. Following step 11, a gray level histogram (gray level distribution) is found at step 21. Since only the gray levels of the pixels at the center points of the cells are found at step 11, if luminance unevenness does not exist, the gray level distribution should be separated completely into two crests. Even if luminance unevenness exists, the gray level distribution should be separated into two crests in case where monochrome contrast is strong. If such a distribution is found, binarization can be executed with a fixed threshold value.

If the brightness distribution is separated completely into two crests, the gray level between the two crests is adopted as a threshold value at step 23 and the gray levels are binarized according to the found threshold value.

If the brightness distribution is not separated into two crests, control goes to step 12 and binarization is executed by a similar method to that of the first means.

The binarization method is thus changed depending on the brightness distribution, whereby the detected two-dimensional code area does not contain luminance unevenness or monochrome contrast is strong, cells can be binarized at higher speed and if the detected two-dimensional code area contain luminance unevenness, binarization is executed by a similar method to that of the first means, whereby high-speed cell binarization can be realized regardless of luminance unevenness.

According to the embodiments we have discussed, a local threshold value is found only from the gray levels of the pixels at the center points of the cells found from the position, the rotation angle, and the numbers of cells of two-dimensional code found by the detection means and binarization is executed, so that the processing time of the cell binarization means can be shortened and binarization can be executed without receiving the effect of luminance unevenness.

After the gray levels of the pixels at the center points of the cells are found, a histogram of the gray levels is prepared. If it is determined that no luminance unevenness exists according to the gray level distribution, one threshold value is found from the gray levels and all cells are binarized. Thus, the processing time of the cell binarization means can be furthermore shortened. If it is determined that luminance unevenness exists, a local threshold value is found and binarization is executed, whereby cells can be binarized without receiving the effect of luminance unevenness.

Since the vertical and horizontal scanning lines can be spaced widely, accessing the image memory is lessened and an image need not be binarized before the detection process, thus two-dimensional code can be detected at high speed. Since two-dimensional code is detected in response to change in the gray levels of the pixels on the scanning lines, it can be detected without receiving the effect of luminance unevenness.

If an edge on the scanning line is lost due to dirt, etc., two-dimensional code can be reliably detected by moving the scanning line.

What is claimed is:

1. A two-dimensional code reader comprising:
   conversion means for receiving light reflected from two-dimensional code and converting the light into an image signal;
   storage means for storing the image signal as an image memory;
   code detection means for providing from the image memory a detected two-dimensional code; and
   cell binarization means for binarizing values of predetermined pixels for respective cells on the detected two-dimensional code, said cell binarization means comprising:
      cell gray level extraction means for finding respective gray levels of the predetermined pixels based on image signals obtained from the predetermined pixels of the cells on the detected two-dimensional code;
      local threshold value determination means for finding a local threshold value from the gray levels determined by said cell gray level extraction means; and cell binary determination means for comparing each of the gray levels found by said cell gray level extraction means with the threshold value found by said local threshold value determination means to find binary data for a corresponding cell;

wherein said local threshold value determination means defines a plurality of small areas, finds an average value and amplitude of maximum and minimum values of the gray levels of the predetermined pixels of the cells located in each of the small areas, compares adjacent small areas in terms of amplitude, and if one of the small areas has an amplitude of a predetermined value or less as compared with the other, determines a threshold value of the former small area based on the latter small area.

2. The two-dimensional code reader as claimed in claim 1 wherein said local threshold value determination means compares the adjacent small areas in terms of amplitude, and unless one of the small areas has the amplitude of the predetermined value or less as compared with the other, adopts an average value of the average values found in the small areas as a threshold value of the former small area.

* * * * *